United States Patent
Bassin et al.

(10) Patent No.: US 10,185,649 B2
(45) Date of Patent: Jan. 22, 2019

(54) SYSTEM AND METHOD FOR EFFICIENT CREATION AND RECONCILIATION OF MACRO AND MICRO LEVEL TEST PLANS

(71) Applicant: INTERNATIONAL BUSINESS MACHINES CORPORATION, Armonk, NY (US)

(72) Inventors: Kathryn A. Bassin, Harpursville, NY (US); Sheng Huang, Shanghai (CN); Steven Kagan, Burr Ridge, IL (US); Shao C. Li, Beijing (CN); Zhong J. Li, Beijing (CN); He H. Liu, Beijing (CN); Susan E. Skrabanek, Talking Rock, GA (US); Hua F. Tan, Beijing (CN); Jun Zhu, Shanghai (CN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 14/996,909

(22) Filed: Jan. 15, 2016

(65) Prior Publication Data
US 2016/0132425 A1    May 12, 2016

Related U.S. Application Data

(63) Continuation of application No. 13/930,870, filed on Jun. 28, 2013, now Pat. No. 9,262,736, which is a (Continued)

(51) Int. Cl.
*G06F 9/44* (2018.01)
*G06F 11/36* (2006.01)
*G06Q 10/00* (2012.01)
*G06Q 10/06* (2012.01)
*G06Q 10/10* (2012.01)
(Continued)

(52) U.S. Cl.
CPC ............ *G06F 11/3684* (2013.01); *G06F 8/70* (2013.01); *G06F 11/3608* (2013.01); *G06Q 10/00* (2013.01); *G06Q 10/067* (2013.01); *G06Q 10/06375* (2013.01); *G06Q 10/103* (2013.01);
(Continued)

(58) Field of Classification Search
CPC ................................................ G06Q 10/06375
See application file for complete search history.

(56) References Cited

U.S. PATENT DOCUMENTS

| | | | |
|---|---|---|---|
| 5,539,652 | A | 7/1996 | Tegethoff |
| 5,651,111 | A | 7/1997 | McKeeman et al. |

(Continued)

OTHER PUBLICATIONS

Notice of Allowance dated Sep. 21, 2016 in related U.S. Appl. No. 14/160,954, 8 pages.
(Continued)

*Primary Examiner* — Hang Pan
(74) *Attorney, Agent, or Firm* — Christopher K. McLane; Andrew M. Calderon; Roberts Mlotkowski Safran Cole & Calderon, P.C.

(57) ABSTRACT

A method includes creating a macro plan for a test project, creating a micro plan for the test project, wherein the micro plan and the macro plan are based on at least one common parameter, and reconciling the macro plan and the micro plan by identifying deviations between the macro plan and the micro plan based on the at least one common parameter.

20 Claims, 29 Drawing Sheets

Related U.S. Application Data continuation of application No. 12/558,260, filed on Sep. 11, 2009, now Pat. No. 8,539,438.

(51) Int. Cl.
  *G06Q 30/00* (2012.01)
  *G06Q 30/02* (2012.01)
  *G06F 8/70* (2018.01)

(52) U.S. Cl.
  CPC ......... *G06Q 30/00* (2013.01); *G06Q 30/0244* (2013.01)

(56) References Cited

U.S. PATENT DOCUMENTS

| | | | |
|---|---|---|---|
| 5,724,273 | A | 3/1998 | Desgrousilliers et al. |
| 5,854,924 | A | 12/1998 | Rickel et al. |
| 5,905,856 | A | 5/1999 | Ottensooser |
| 6,154,876 | A | 11/2000 | Haley et al. |
| 6,186,677 | B1 | 2/2001 | Angel et al. |
| 6,243,863 | B1 | 6/2001 | Kothari et al. |
| 6,332,211 | B1 | 12/2001 | Pavela |
| 6,442,748 | B1 | 8/2002 | Bowman-Amuah |
| 6,456,506 | B1 | 9/2002 | Lin |
| 6,477,471 | B1 | 11/2002 | Hedstrom et al. |
| 6,519,763 | B1 | 2/2003 | Kaufer et al. |
| 6,546,506 | B1 | 4/2003 | Lewis |
| 6,601,017 | B1 | 7/2003 | Kennedy et al. |
| 6,601,233 | B1 | 7/2003 | Underwood |
| 6,725,399 | B1 | 4/2004 | Bowman |
| 6,766,473 | B2 | 7/2004 | Nozuyama |
| 6,862,696 | B1 | 3/2005 | Voas et al. |
| 6,889,167 | B2 | 5/2005 | Curry |
| 6,901,535 | B2 | 5/2005 | Yamauchi et al. |
| 6,988,055 | B1 | 1/2006 | Rhea et al. |
| 7,080,351 | B1 | 7/2006 | Kirkpatrick et al. |
| 7,200,775 | B1 | 4/2007 | Rhea et al. |
| 7,219,287 | B1 | 5/2007 | Toutounchi et al. |
| 7,231,549 | B1 | 6/2007 | Rhea et al. |
| 7,334,166 | B1 | 2/2008 | Rhea et al. |
| 7,451,009 | B2 | 11/2008 | Grubb et al. |
| 7,630,914 | B2 | 12/2009 | Veeningen et al. |
| 7,788,647 | B2 | 8/2010 | Martin et al. |
| 7,809,520 | B2 | 10/2010 | Adachi |
| 7,861,226 | B1 | 12/2010 | Episkopos et al. |
| 7,886,272 | B1 | 2/2011 | Episkopos et al. |
| 7,917,897 | B2 | 3/2011 | Bassin et al. |
| 7,984,304 | B1 | 7/2011 | Waldspurger et al. |
| 8,001,530 | B2 | 8/2011 | Shitrit |
| 8,191,044 | B1 | 5/2012 | Berlik et al. |
| 8,224,472 | B1 | 7/2012 | Maluf et al. |
| 8,539,438 | B2 | 9/2013 | Bassin et al. |
| 8,578,341 | B2 | 11/2013 | Bassin et al. |
| 8,688,426 | B2 | 4/2014 | Al-Shammari |
| 9,052,981 | B2 | 6/2015 | Bassin et al. |
| 2001/0052108 | A1 | 12/2001 | Bowman-Amuah |
| 2002/0078401 | A1 | 6/2002 | Fry |
| 2002/0188414 | A1 | 12/2002 | Nulman |
| 2003/0018952 | A1 | 1/2003 | Roetzheim |
| 2003/0033191 | A1 | 2/2003 | Davies et al. |
| 2003/0058277 | A1 | 3/2003 | Bowman-Amuah |
| 2003/0070157 | A1 | 4/2003 | Adams et al. |
| 2003/0196190 | A1 | 10/2003 | Ruffolo et al. |
| 2004/0205727 | A1 | 10/2004 | Sit et al. |
| 2004/0225465 | A1 | 11/2004 | Pramanick et al. |
| 2004/0267814 | A1 | 12/2004 | Ludwig et al. |
| 2005/0021766 | A1 | 1/2005 | Mckeowen et al. |
| 2005/0060598 | A1 | 3/2005 | Klotz et al. |
| 2005/0071807 | A1 | 3/2005 | Yanavi |
| 2005/0102654 | A1 | 5/2005 | Henderson et al. |
| 2005/0114828 | A1 | 5/2005 | Dietrich et al. |
| 2005/0144529 | A1 | 6/2005 | Gotz et al. |
| 2005/0209866 | A1 | 9/2005 | Veeningen et al. |
| 2005/0283751 | A1 | 12/2005 | Bassin et al. |
| 2006/0047527 | A1 | 3/2006 | Caveny et al. |
| 2006/0047617 | A1 | 3/2006 | Bacioiu et al. |
| 2006/0123389 | A1 | 6/2006 | Kolawa et al. |
| 2006/0248504 | A1 | 11/2006 | Hughes |
| 2006/0251073 | A1 | 11/2006 | Lepel et al. |
| 2006/0265188 | A1 | 11/2006 | French et al. |
| 2007/0028220 | A1 | 2/2007 | Miller et al. |
| 2007/0100712 | A1 | 5/2007 | Kilpatrick et al. |
| 2007/0101215 | A1 | 5/2007 | Holmqvist |
| 2007/0112879 | A1 | 5/2007 | Sengupta |
| 2007/0162257 | A1 | 7/2007 | Kostyk et al. |
| 2007/0168744 | A1 | 7/2007 | Pal et al. |
| 2007/0174023 | A1 | 7/2007 | Bassin et al. |
| 2007/0192754 | A1 | 8/2007 | Hofsaess |
| 2007/0233414 | A1 | 10/2007 | Kratschmer et al. |
| 2007/0234294 | A1 | 10/2007 | Gooding |
| 2007/0283325 | A1 | 12/2007 | Kumar |
| 2007/0283417 | A1 | 12/2007 | Smolen et al. |
| 2007/0300204 | A1 | 12/2007 | Andreev et al. |
| 2008/0010543 | A1 | 1/2008 | Yamamoto et al. |
| 2008/0016415 | A1 | 1/2008 | Ide |
| 2008/0022167 | A1 | 1/2008 | Chung et al. |
| 2008/0052707 | A1* | 2/2008 | Wassel .................. G06F 9/455 717/174 |
| 2008/0072328 | A1 | 3/2008 | Walla et al. |
| 2008/0092108 | A1 | 4/2008 | Corral |
| 2008/0092120 | A1 | 4/2008 | Udupa et al. |
| 2008/0104096 | A1 | 5/2008 | Doval et al. |
| 2008/0162995 | A1 | 7/2008 | Browne et al. |
| 2008/0163140 | A1 | 7/2008 | Fouquet et al. |
| 2008/0178145 | A1 | 7/2008 | Lindley |
| 2008/0201611 | A1* | 8/2008 | Bassin ................ G06F 11/3604 714/37 |
| 2008/0201612 | A1 | 8/2008 | Bassin et al. |
| 2008/0255693 | A1 | 10/2008 | Chaar et al. |
| 2009/0070734 | A1 | 3/2009 | Dixon et al. |
| 2009/0089755 | A1 | 4/2009 | Johnson et al. |
| 2009/0319317 | A1 | 12/2009 | Colussi et al. |
| 2010/0005444 | A1 | 1/2010 | McPeak |
| 2010/0017787 | A1 | 1/2010 | Bellucci et al. |
| 2010/0145929 | A1 | 6/2010 | Burger et al. |
| 2010/0211957 | A1 | 8/2010 | Lotlikar et al. |
| 2010/0275263 | A1 | 10/2010 | Bennett et al. |
| 2010/0319004 | A1 | 12/2010 | Hudson et al. |
| 2010/0332274 | A1 | 12/2010 | Cox et al. |
| 2011/0271137 | A1 | 11/2011 | Krieg et al. |
| 2011/0296371 | A1 | 12/2011 | Marella |
| 2012/0017195 | A1 | 1/2012 | Kaulgud et al. |
| 2012/0053986 | A1 | 3/2012 | Cardno et al. |
| 2012/0144374 | A1 | 6/2012 | Gallagher et al. |
| 2016/0140021 | A1 | 5/2016 | Lopian |

OTHER PUBLICATIONS

Notice of Allowance dated Oct. 28, 2016 in related U.S. Appl. No. 15/016,898, 31 pp.

Office Action dated Nov. 18, 2016 in related U.S. Appl. No. 15/215,664, 7 pages.

Final Office Action dated May 6, 2016 in related U.S. Appl. No. 14/160,954, 35 pp.

Final Office Action dated May 19, 2016 in related U.S. Appl. No. 12/588,324 7 pp.

Notice of Allowance dated May 31, 2016 for related U.S. Appl. No. 14/844,422, 10 pages.

Office Action dated Jul. 1, 2016 in related U.S. Appl. No. 14/685,700, 10 pages.

Office Action dated Jun. 30, 2016 in related U.S. Appl. No. 15/016,898, 61 pages.

McGarry, J. et al., "Practical Software Measurement: A Guide to Objective Program Insight", http://pdf.aminer.org/000/361/576/practical_software_measurement.pdf, Naval Undersea Warfare Center, Version 2.1, Part 1 to Part 4, 1996, 299 pages.

Kwinkelenberg, R. et al., "Smartesting for Dummies", Oct. 14, 2008, Wiley, 36 pages.

Lazic, L. et al., "Cost Effective Software Test Metrics", WSEAS Transactions on Computers, Issue 6, vol. 7, Jun. 2008, pp. 559-619.

Hou, R. et al., Optimal Release Times for Software Systems with Scheduled Delivery Time Based on the HGDM, IEEE Transactions on Computers, vol. 46, No. 2, Feb. 1997, pp. 216-221.

(56) References Cited

OTHER PUBLICATIONS

Jonsson, G., "A Case Study into the Effects of Software Process Improvement on Product Quality", Jun. 2004, Master's Tesis in Computer Science—University of Iceland, 93 pages.

Boehm, B., "Software Engineering Economics", IEEE Transactions on Software Engineering, vol. SE-19, No. 1, Jan. 1984, pp. 4-21.

Basili, V. et al., "Comparing the Effectiveness of Software Testing Strategies", IEEE Transactions on Software Engineering, vol. SE-13, No. 12, Dec. 1987, pp. 1278-1296.

LSU (Estimating Project Costs & Time, Louisiana State University, dated Jul. 25, 2004; retrieved online Oct. 18, 2012; URL: http://laspace.lsu.edu/aces/Lectures/Management/Lecture%205%20-%20Estimating%20Costs.ppt).

Holden, I. et al., "Imporoving Testing Efficiency using Cumulative Test Analysis", Proceedings of the Testing: Academic & Idustrial conference—Practice and Research Techniques, IEEE, 2006, pp. 1-5.

Holden, I., "Improving Testing Efficiency using Cumulative Test Analysis", 2006, 25 slices, retrieved from http://www2006.taicpart.org/presentations/session5/3.pdf, pp. 1-25.

Tonella, P., "Publication List", 2012, retrieved from http://selab.fbk.eu/tonella/papersbyyear.html, 15 pages.

Ponaraseri, S. et al., "Using the Planning Game for Test Case Prioritization", retrieved from http:selabi.fbk.eu/tonella/papers/issre2008.pdf, 2008, pp. 1-10.

Ambler, S., "Choosing the Right Software Method for the Job", http://web.archive.org/web/20090219074845/http://agiledata.org/essays/differentStrategies.html, retrieved Jun. 7, 2012, pp. 1-14.

Unknown, "ASTQB—ISTQB Software Testing Certification : ISTQB Syllabi", http://web.archive.orb/web/20090423053623/http://www.astqb.org/educational-resources/syllabi-management5.php, retrieved Jun. 7, 2012, pp. 1-12.

Hurlbut, "Managing Domain Architecture Evolution Through Adaptive Use Case and Business Rule Models", 1997, pp. 1-42.

Ulrich, "Test Case Dependency Processing in Robot Framework", https://groups.google.com/forum/?fromgroups#!topic/robotframework-users/twcycBNLXI4, Google, Feb. 16, 2009, pp. 1-4.

Chan et al., "A Tool to Support Perspective Based Approach to Software Code Inspection", Proceedings of the 2005 Australian Software Engineering Conference, IEEE, 2005, 8 pages.

Office Action dated Jan. 12, 2017 in related U.S. Appl. No. 12/558,324, 13 pages.

Final Office Action dated Dec. 15, 2016 in related U.S. Appl. No. 14/658,700, 18 pages.

Notice of Allowance dated Mar. 8, 2017 in related U.S. Appl. No. 14/685,700, 16 pages.

Office Action dated Oct. 18, 2017 in related U.S. Appl. No. 12/558,324, 11 pp.

Notice of Allowance dated Apr. 19, 2017 in related U.S. Appl. No. 15/215,664 , 10 pp.

Final Office Action dated Jun. 15, 2017 in related U.S. Appl. No. 12/558,324, 14pp.

Final Office Action dated Feb. 28, 2018 in related U.S. Appl. No. 12/558,324, 14 pp.

\* cited by examiner

FIG. 12

| Complexity \ Size | Small | | | | Medium | | | | Large | | | |
|---|---|---|---|---|---|---|---|---|---|---|---|---|
| Low | Sequence | Coverage | Variation | Interaction | Sequence | Coverage | Variation | Interaction | Sequence | Coverage | Variation | Interaction |
| Medium | Sequence | Coverage | Variation | Interaction | Sequence | Coverage | Variation | Interaction | Sequence | Coverage | Variation | Interaction |
| High | Sequence | Coverage | Variation | Interaction | Sequence | Coverage | Variation | Interaction | Sequence | Coverage | Variation | Interaction |

SYSTEM AND METHOD FOR EFFICIENT CREATION AND RECONCILIATION OF MACRO AND MICRO LEVEL TEST PLANS

CROSS REFERENCE TO RELATED APPLICATIONS

The present invention is related to co-pending application Ser. Nos. 12/558,327, 12/558,263, and 12/558,147, the contents of which are incorporated herein by reference in their entireties.

FIELD OF THE INVENTION

The present invention generally relates to project test planning, and more particularly, to a method and system to create and reconcile macro level and micro level test plans.

BACKGROUND

While software systems continue to grow in size and complexity, business demands continue to require shorter development cycles. This has led some software developers to compromise on functionality, time to market, and quality of software products. Furthermore, the increased schedule pressures and limited availability of resources and skilled labor can lead to problems such as incomplete design of software products, inefficient testing, poor quality, high development and maintenance costs, and the like. This may lead to poor customer satisfaction and a loss of market share for companies developing software and other products.

To improve product quality, many organizations devote an increasing share of their resources to testing and identifying problem areas related to software and the process of software development. Accordingly, it is not unusual to include a quality assurance team in software development projects to identify defects in the software product during and after development of a software product. By identifying and resolving defects before marketing the product to customers, software developers can assure customers of the reliability of their products, and reduce the occurrence of post-sale software fixes such as patches and upgrades which may frustrate their customers.

Testing and identifying problem areas related to software development may occur at different points or stages in a software development lifecycle. For example, a general software development lifecycle includes a high level requirements/design review, a detailed requirements/design review, code inspection, unit test, system test, system integration test, potentially a performance test, and typically, a user acceptance test. Moreover, as the software development lifecycle proceeds from high level requirements/design review to user acceptance test, costs for detecting and remedying software defects generally increases, e.g., exponentially.

In an effort to reign in cost and time overruns, organizations sometimes develop one or more test plans that consolidate ideas on how to allocate effort for a test project. Test plans may include efforts regarding how to design testing activities and focus for the test project. Planning for a test project (e.g., testing project planning, test project planning, project test planning) normally contains two key levels of planning: macro planning and micro planning.

Macro planning is typically achieved using a top-down approach. Macro planning is most effectively performed in the early stages of a project, and is usually accomplished by comparing the current project to the most appropriate available historical project. The result of macro planning is a high level plan for how to allocate effort and how to design the testing activities and focus. The challenges to macro planning frequently include the ability to find a sufficiently similar historical project on which to base planning decisions for the current test project.

Micro planning is typically achieved using a bottom-up approach, and generally includes very detailed plans for every test to be performed after the Unit Test. For example, a micro plan may define how to run a particular test, including the date(s) for the test, the personnel involved with the test, what to do with the results of the test, etc. As any project moves forward in time, more detailed information (e.g., requirements) become available. Very mature organizations might be able to effectively leverage micro planning by looking at the different characteristics of requirements (e.g., risk, size, complexity associated with each). When an organization can do this, they are able to produce a more granular and precise estimation of the effort required, as well as the specific optimum test focus of each defined activity in the macro plan. However, given the pace of schedules, it is increasingly challenging for projects to produce accurate, timely, and cost effective micro plans.

Current industry practice is to create a macro plan and a micro plan in isolation from one another, if one or both types of plans are even created at all. Because macro plans and micro plans are created separately from one another, common practices involving macro top-down and micro bottom-up test planning produce plans having disjointed perspectives. As a result, macro plans and micro plans often do not synchronize with one another due to several factors. One factor may be that different testing levels or activities are often defined differently in the macro and micro plans. For example, micro plan test activities do not necessarily map to those defined in the macro plan due to overlapping schedules required by schedule pressure, shared test environments required by limited infrastructure, or other constraints that frequently are only identified after macro planning is complete. Early in the life cycle when the macro plan is being developed, very little of the detailed information necessary to develop a micro test plan exists, e.g., cost, effort, schedule, and quality targets, etc. This can lead to stark differences between the macro and micro plans.

Another factor that contributes to divergence between macro and micro plans is that different resources (e.g., people) normally perform the macro and micro planning functions. For example, macro planning is often performed by a project manager or consultant, with input from a test strategist or architect. On the other hand, micro planning is typically performed after the macro planning and by different resources, such as the assigned test lead and/or test team personnel. Frequently there is little or no attention paid to ensuring the micro and macro plans are in synchronization throughout the duration of the project.

Another factor that contributes to the isolated and separate nature of macro and micro plans is that different tools are often used for macro and micro planning. For example, macro test planning typically involves some kind of scheduler software such as Microsoft Project, whereas effective micro test planning requires sophisticated requirements management tooling and reporting capabilities. No existing macro or micro tools are designed to integrate with one another, and no integrated tool currently exists.

Complex system development is very expensive and high risk. Due in part to the disjointed nature of test planning described above, a majority of defects are often found later in the life cycle where the cost to fix such defects increases exponentially with time. Test projects are planned inefficiently and/or ineffectively because there is no solution that provides the real time insight necessary to find and fix defects as early as possible.

Although scheduling software can help allocate resources on simple projects, the task of optimally staffing test execution projects is a more complex problem to solve due to the unknown impact of blocking defects resulting from test dependencies. If test resource allocation is not carefully constructed and maintained, a test project can very quickly find themselves in a situation where multiple resources may be delayed or blocked entirely from making any progress for unacceptably long periods of time. In these cases, test costs relative to benefits received are significantly higher than they should be, and the negative impact to cost and schedule is typically severe.

Conventional test planning tools and methods do not provide a mechanism to model alternative test scenario planning for the purposes of comparing them and determining the optimal balance of cost, risk, quality and schedule. As a result, "what if" alternative test planning typically is not performed by most projects since it is largely a manual task and too labor intensive to be delivered in real time for projects to benefit from the information.

Moreover, there is no model in the industry that is capable of predicting the number, severity, and cost of defects. Yet, increasingly, project stakeholders could make better decisions if this information could be made available to them in a timely way.

Furthermore, the differences between historic project information and the current project frequently result in inaccuracies between projections based on historical data compared against the actual current project results. Even further, the approach of using historical projects for estimation provides no guidance or useful insight into how to best adjust plans while the project is underway to reflect changed conditions. As a result, detailed estimation planning and/or ongoing calibration is rarely actually performed on many of the large and complex efforts that would most benefit from it.

Additionally, there are no industry wide models available to provide appropriate expected distributions of defects uncovered in System Integration Testing (SIT). As a result, SIT testing tends to be one of the most expensive kinds of testing relative to the benefit received. At the same time, SIT often is the most important testing phase to ensure a successful move to production for complex system integration projects.

As a result of the above-noted difficulties in test planning, macro plans and micro plans, if created at all, are often set aside and ignored soon after their creation. Projects often begin with the intent of developing and following the plans. However, as problems arise and real actions inevitably deviate from the plans, an escalation can occur where one deviation from the plans leads to another deviation which leads to another, and so forth. Soon, the plans are discarded and the project deals with problems 'on the fly' as they occur (i.e., without any organized plan). This, in turn, often leads to cost and time overruns, which ultimately frustrates the customer (e.g., end user).

Accordingly, there exists a need in the art to overcome the deficiencies and limitations described herein above.

SUMMARY

In a first aspect of the invention, there is a method implemented in a computer infrastructure. The computer infrastructure has computer executable code tangibly embodied on a computer readable storage medium having programming instructions operable to: create a macro plan for a test project; create a micro plan for the test project, wherein the micro plan and the macro plan are based on at least one common parameter; and reconcile the macro plan and the micro plan by identifying deviations between the macro plan and the micro plan based on the at least one common parameter.

In another aspect of the invention, a system comprising a test planning optimization workbench including a macro planning tool operable to create a macro plan for a test project, a micro planning tool operable to create a micro plan for the test project, and a reconciliation manager operable to identify and reconcile deviations between the macro plan and the micro plan.

In an additional aspect of the invention, there is a computer program product comprising a computer usable storage medium having readable program code embodied in the storage medium. The computer program product includes at least one component operable to: create a macro plan for a test project based on a set of triggers and activities; create a micro plan for the test project based on the set of triggers and activities; and reconcile the macro plan and the micro plan by identifying deviations between the macro plan and the micro plan based on the set of triggers and activities.

In a further aspect of the invention, a computer system for providing a comprehensive plan for a test program. The system comprises: a processor, a computer readable memory, and a computer readable storage media; first program instructions to generate a macro plan; second program instructions to generate a micro plan; and third program instructions to reconcile the macro plan and the micro plan. The first, second, and third program instructions are stored on the computer readable storage media for execution by the processor via the computer readable memory.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

FIGS. 7-13 show exemplary user interfaces and underlying functionality in accordance with aspects of the invention;

FIGS. 15-22 show exemplary user interfaces and underlying functionality in accordance with aspects of the invention;

DETAILED DESCRIPTION

Figure 1:
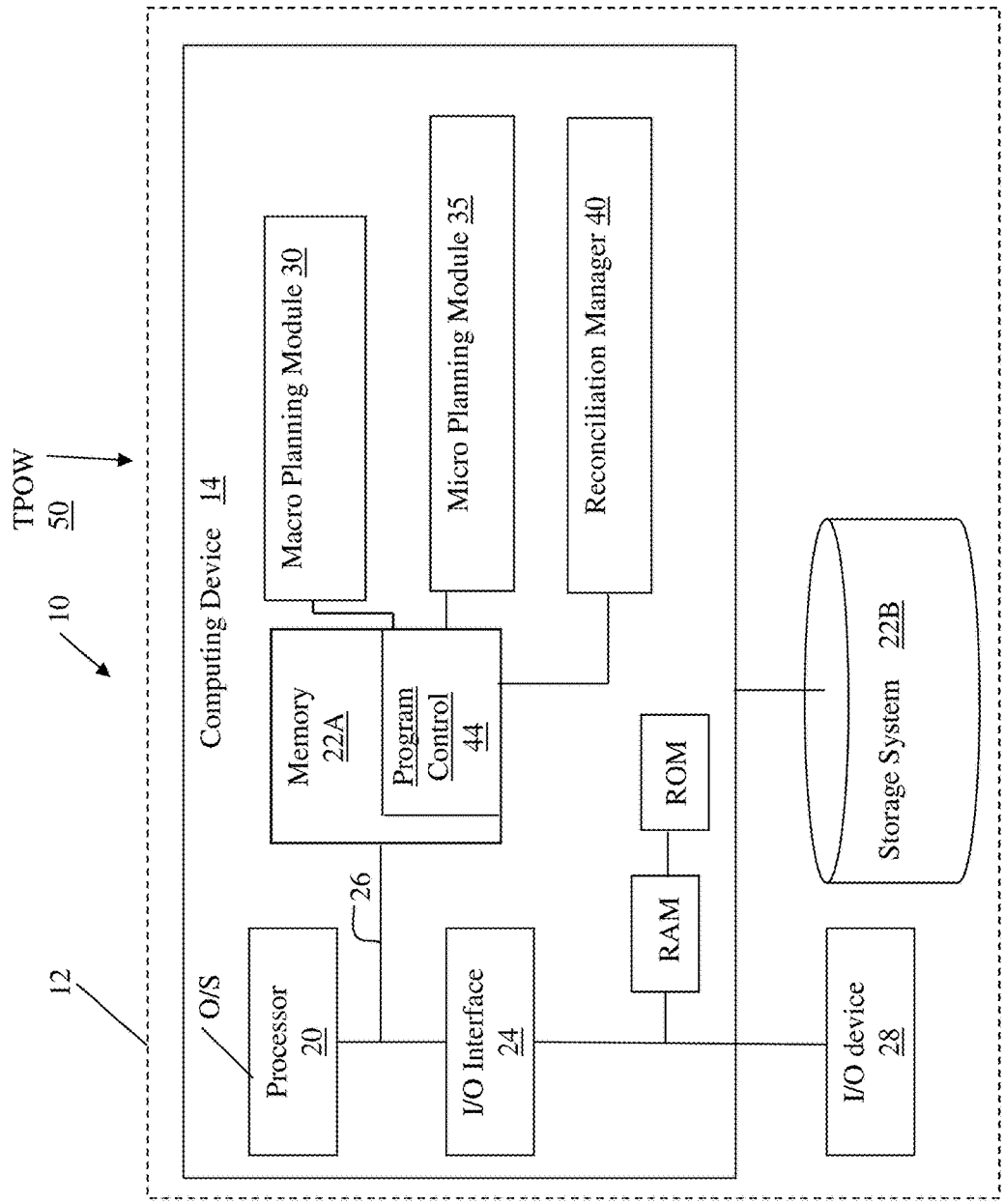
FIGS. 1 and 2 show illustrative environments for implementing the steps in accordance with aspects of the invention.

The present invention generally relates to project test planning, and more particularly, to a method and system to create and reconcile macro and micro level test plans. In accordance with aspects of the invention, a planning tool and method are provided that generates a macro plan and a micro plan that are defined in terms of at least some common parameters. The use of common parameters permits the planning tool and method to reconcile the macro and micro plans for a more effective overall planning strategy. In embodiments, a macro plan is developed based upon "activity" and "trigger" attributes of the Orthogonal Defect Classification (ODC) and Defect Reduction Method (DRM) schema, described in greater detail herein. The macro plan may be used to drive (e.g., guide, influence, etc.) the generation of a micro plan, which is also based at least partly on the same activity and trigger attributes of the ODC and DRM. In further embodiments, the macro and micro plans are reconciled using the commonality provided by the activity and trigger attributes to compare the plans and appropriately handle deviations between the plans. In this manner, implementations of the invention may be used to provide a planning tool and method that provides reconciled macro and micro plans early in a project life cycle. Information gleaned from the reconciled macro and micro plans may be used for many aspects of project planning, such as scheduling, budgeting, and staffing, to name but a few.

Moreover, because the macro and micro plans are based on common parameters and reconciled, implementations of the invention may be used to perform 'what-if' analyses in which one or more changes to the plans (e.g., changes to variables) are investigated to see how the changes propagate through the entire project life cycle. Additionally, since the macro and micro plans are based on common parameters and reconciled, the plans can be updated with test data as actual test results become available. In embodiments, such updates are propagated (e.g., calibrated) through the plans, which allows the predictions provided by the plans to become more accurate as the test project advances through the project life cycle.

In embodiments, a test planning model is based on the activity and trigger attributes of the DRM in a way that enables a software tool, e.g., the Test Planning Optimization Workbench (TPOW 50), to reconcile the macro and micro plans for analysis. In this manner, implementations of the invention provide methods and systems to define, adapt, analyze, and reconcile top-down macro test planning with bottom-up micro test planning. The test planning model may also include the sets of test planning dimensions, including but not limited to: Effort Distribution, Defect Distribution, Cost, Schedule, and Test Cases.

Accordingly, implementations of the invention provide an integrated solution for test planning practitioners working in macro and/or micro planning to ensure that both efforts are aligned with one another effectively. When both macro and micro test plans are coordinated, as with implementations of the present invention, projects have the tools to meet quality goals, test budget targets, as well as schedule and time to market demands.

Implementations of the invention approach the problem of reconciling test plans by providing a method and apparatus that: (1) defines a structured test planning model that applies across any kind of product or system delivery project in any kind of industry, and (2) delivers an integrated analysis including actionable recommendations for achieving optimal results based on a variety of macro and micro planning input. In embodiments, the structured test planning model is based on elements from the DRM. In this manner, embodiments of the invention provide an integrated tool that is capable of producing consistent defect removal guidelines and actionable recommendations at both the macro and micro planning levels.

In contrast to the present invention, conventional test planning and management tools (e.g., Rational Functional Tester, Rational Quality Manager, HP Mercury Test Director, etc.) are designed in a bottom-up way to enable the creation of test cases and organize them into a test suite and/or to enable the authoring/automated execution of test scripts. Such conventional tools do not provide any top-down model for organizing a macro test plan, and do not provide or handle micro content of the testing focus in each of the phases. Additionally, conventional tools typically cannot effectively be leveraged until later in the life cycle, when detailed test script creation is finally underway. This time frame is typically too late in the life cycle to be developing an effective micro level test plan, which is one of the main reasons testing is often expensive when the cost is compared to the benefit received. Existing solutions merely function as repositories and/or execution tools, whereas implementations of the invention function as a true planning optimization and modeling tool.

In embodiments, the inventive planning tool provides for creating and implementing micro test plans that are capable of dynamically adjusting to changes in execution strategy, changes in environment and/or infrastructure availability, and/or other unforeseen constraints that require corrective action of some kind. In contrast to conventional test planning and management tools, implementations of the invention provide capabilities for adapting to rapid changes that are very common across complex system integration and product development efforts across all industries today.

System Environment

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following:

an electrical connection having one or more wires,
a portable computer diskette,
a hard disk,
a random access memory (RAM),
a read-only memory (ROM),
an erasable programmable read-only memory (EPROM or Flash memory),
an optical fiber,
a portable compact disc read-only memory (CDROM),
an optical storage device,
a transmission media such as those supporting the Internet or an intranet, or
a magnetic storage device.

The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network. This may include, for example, a local area network (LAN) or a wide area network (WAN), or the connection may be made to an external computer (for example, through the Internet using an Internet Service Provider).

FIG. 1 shows an illustrative environment 10 for managing the processes in accordance with the invention. To this extent, the environment 10 includes a server or other computing system 12 that can perform the processes described herein. In particular, the server 12 includes a computing device 14. The computing device 14 can be resident on a network infrastructure or computing device of a third party service provider (any of which is generally represented in FIG. 1). In embodiments, the environment 10 may be designated as a test planning optimization workbench (TPOW) 50.

The computing device 14 also includes a processor 20, memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and an operating system (O/S).

The computing device 14 is in communication with the external I/O device/resource 28 and the storage system 22B. For example, the I/O device 28 can comprise any device that enables an individual to interact with the computing device 14 or any device that enables the computing device 14 to communicate with one or more other computing devices using any type of communications link. The external I/O device/resource 28 may be for example, a handheld device, PDA, handset, keyboard etc. In embodiments, the DAS/DRM defect profiles may be stored in storage system 22B or another storage system, which may be, for example, a database.

In general, the processor 20 executes computer program code (e.g., program control 44), which can be stored in the memory 22A and/or storage system 22B. Moreover, in accordance with aspects of the invention, a program control 44 controls a macro planning module 30, a micro planning module 35, and a reconciliation manager 40, described in greater detail herein. While executing the computer program code, the processor 20 can read and/or write data to/from memory 22A, storage system 22B, and/or I/O interface 24. The program code executes the processes of the invention. The bus 26 provides a communications link between each of the components in the computing device 14.

The computing device 14 can comprise any general purpose computing article of manufacture capable of executing computer program code installed thereon (e.g., a personal computer, server, etc.). However, it is understood that the computing device 14 is only representative of various possible equivalent-computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computing infrastructure 12 is only illustrative of various types of computer infrastructures for implementing the invention. For example, in embodiments, the server 12 comprises two or more computing devices (e.g., a server cluster) that communicate over any type of communications link, such as a network, a shared memory, or the like, to perform the process described herein. Further, while performing the processes described herein, one or more computing devices on the server 12 can communicate with one or more other computing devices external to the server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

In embodiments, the computing device 14 includes the macro planning module 30, micro planning module 35, and reconciliation manager 40. In accordance with aspects of the invention, the macro planning module 35 provides a user with the ability to create a top-down macro test plan for a project. In accordance with additional aspects of the invention, the micro planning module 35 provides a user with the ability to create a bottom-up micro test plan for the same project and based on at least some common parameters with the macro test plan created using the macro planning module 30. In accordance with even further aspects of the invention, the reconciliation manager 40 reconciles the macro and micro test plans. In embodiments, the reconciling comprises comparing the macro and micro test plans to one another based on the relationship provided by the common parameters, presenting the user with deviations (e.g., differences, inconsistencies, etc.) between the plans, and permitting the user to adjust parameters of the test plans. The macro planning module 30, micro planning module 35, and reconciliation manager 40 may be implemented as one or more program codes in the program control stored in memory as separate or combined modules. For example, the macro planning module 30, micro planning module 35, and reconciliation manager 40 may comprise and/or utilize at least one of programmed logic, rules, and algorithms in performing the processes described herein.

Figure 2:
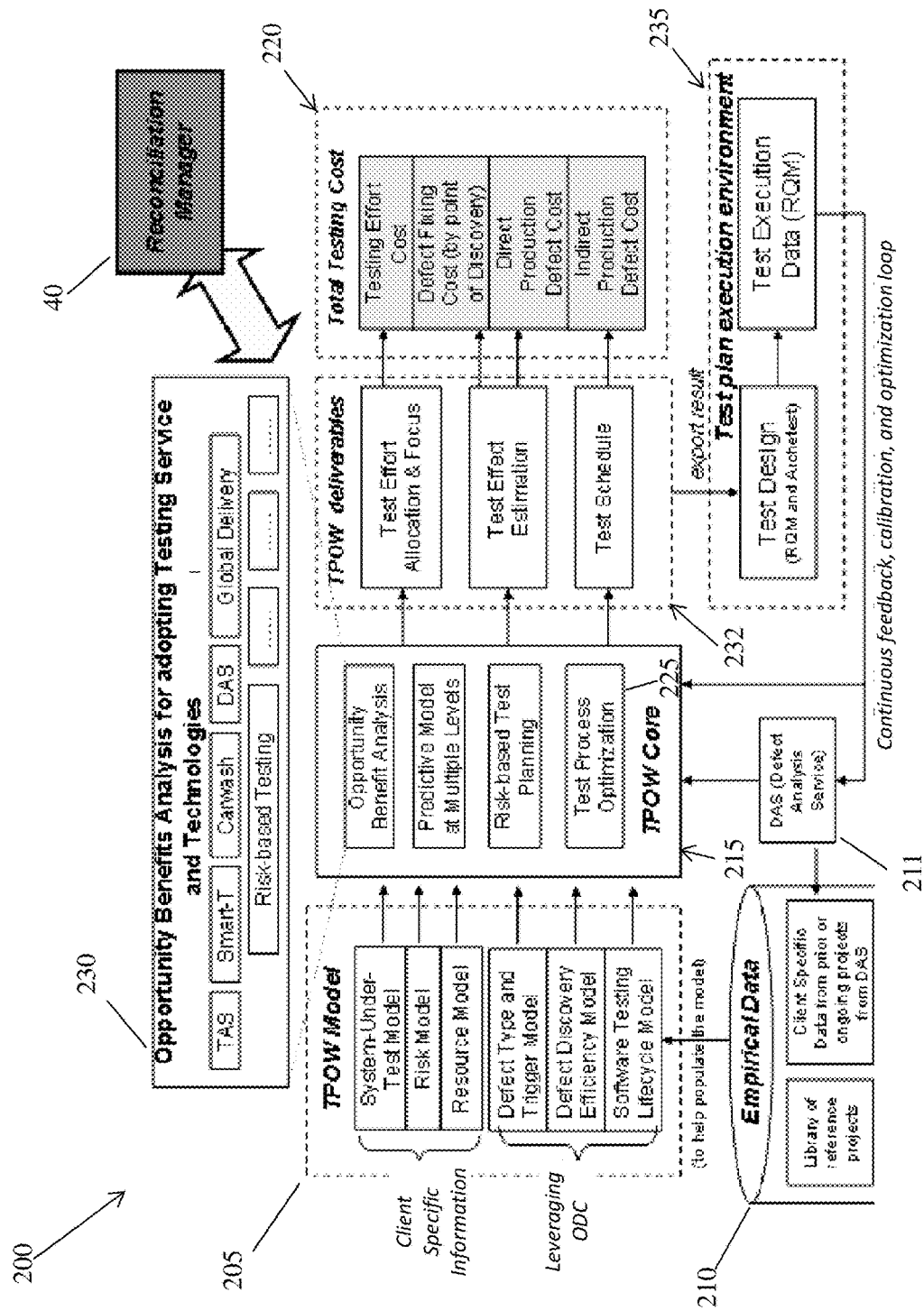

FIG. 2 shows an illustrative architecture 200 for managing the processes in accordance with the invention. FIG. 2 may also represent a high-level flow in accordance with aspects of the invention, and may be implemented with or in the environment of FIG. 1. For example, in accordance with aspects of the invention, the architecture 200 includes a modeling environment 205 that supports the capturing and editing of models to represent the software testing life cycle, defect discovery efficiency, defect type and classification, resource, risk, and system under test elements (requirements, architecture, process, etc). The modeling environment 205 may incorporate client specific information such as a system under test (SUT) model, risk model, and a resource model, all of which are described in greater detail herein. Additionally, the modeling environment 205 may include data leveraged from an existing ODC system or implementation, such as a defect type and trigger model, a defect discovery efficiency model, and a software testing lifecycle model, which are described in greater detail herein.

In embodiments, the architecture 200 includes an empirical data repository 210 that captures the data of prior testing projects, which data can be leveraged as the reference data for estimating at least one of: effort distribution, defect volume, and defect distribution. The data in the repository 210 may be populated from analysis of the existing project defect records with methods like DAS (Defect Analysis Service) 211, which is described in commonly assigned co-pending application Ser. No. 12/558,327, the contents of which are hereby expressly incorporated by reference in their entirety. The data repository may be implemented as the storage system 22B of FIG. 1.

In further embodiments, the architecture 200 includes a prediction engine 215 that leverages the input of test effort distribution, test efficiency, etc., to generate an estimate of the testing result (defect history and production defect numbers classified by type). The prediction engine may be implemented using the TPOW 50 described with respect to FIG. 1, and may include, for example: an opportunity benefit analysis module, a predictive model at multiple levels, risk-based test planning, and a test process optimization engine 225 that provides an optimized test effort distribution with the best return on investment (e.g., to minimize the total testing cost), all of which are described in further detail herein.

In even further embodiments, the architecture 200 includes a cost estimation component 220 that calculates the total costs of testing from various perspectives, e.g., including the testing labor effort cost, defect resolution cost, business cost for production defects, etc. The cost estimation component 220 may include modules for testing effort cost, defect fixing cost, direct production defect cost, and indirect production defect cost, as described in further detail herein.

In even further embodiments, the architecture 200 includes a deliverables component 222. The deliverables component 222 may include, for example, modules for determining test effort allocation and focus, test effect estimation, and test schedule, as described in greater detail herein.

The architecture 200 may optionally include a bundle 230 of optimizers. In embodiments, each optimizer provides a 'what-if' analysis for introducing a new technology or service to the testing lifecycle, which will be reflected as the model changes and will cause the recalculation of cost and/or schedule. In this manner, a clear cost-benefit analysis for adding a new technology or service is provided. Optimizers and what-if analysis are described in greater detail herein.

In further embodiments, the architecture 200 includes a test execution environment monitoring component 235 to capture the runtime test execution information and the real defect information in order to support the calibration of the model for accuracy.

In even further embodiments, the architecture 200 includes a reconciliation manager 40 that compares macro and micro plans together and proposes actionable suggestions to resolve determined deviations between macro and micro plans. The reconciliation manager may be separate from the prediction engine 215 (e.g., the TPOW 50) as shown in FIG. 2, or may be incorporated into the TPOW 50 as shown in FIG. 1. The reconciliation manger 40 is described in greater detail herein.

Structured DRM and ODC

In accordance with aspects of the invention, the TPOW 50 generates defect projections by leveraging aspects of ODC (Orthogonal Defect Classification) and DRM (Defect Reduction Method). More specifically, in embodiments, the TPOW 50 utilizes the "activity" and "trigger" attributes of the ODC/DRM schema, which is described in U.S. Patent Application Publication No. 2006/0265188, U.S. Patent Application Publication No. 2006/0251073, and U.S. Patent Application Publication No. 2007/0174023, the contents of each of which are hereby incorporated by reference herein in their entirety.

Software testing may involve verifying the correctness, completeness, security, quality, etc. of a product. During testing, a technical investigation may be performed by, for example, executing a program or application with the intent to find defects. If defects are found, one or more areas in the software code may be identified based on the defects. Therefore, developers may alter the code in the identified regions to obviate the defect.

ODC is a schema for analyzing defects (e.g., in software related to a project) and focuses on problems with code or documentation. ODC typically is confined to code-related defects, and does not consider the role of a system environment while analyzing such defects. DRM incorporates the schema of ODC while additionally applying a similar approach to defects other than code-related defects (e.g., defects or failures related to and/or caused by system environment).

In the ODC/DRM schema, an "activity" describes one or many defect removal tasks across the entire project life cycle. There are different activities that aim to remove defects in different software development artifacts: requirements, design, code, and documentation. The role of an activity is defined by triggers. Activity, as used in ODC/DRM and the structured DRM model herein, is different from test level (also known as test phase) because one test level/phase can have multiple activities. An activity as used herein may also refer to the actual activity that is being performed at the time the defect is discovered. For example, during the function test phase, one might decide to perform a code inspection. The phase would be function test but the activity is code inspection. While defect removal activities are expected to be tailored from project to project, common activities used across the industry include: High Level Requirements/Design Review (e.g., reviewing design or comparing the documented design against known requirements); Detailed Requirements/Design Review (e.g., reviewing design or comparing the documented design against known requirements); Code Inspection (e.g., examining code or comparing code against the documented design); Unit Test (e.g., 'white box' testing or execution based on detailed knowledge of the code internals); Function Test (e.g., 'black box' execution based on external specifications of functionality); System Test (e.g., Testing or execution of the complete system, in the real environment, requiring all resources); System Integration Test; Performance Test; and User Acceptance Test. The invention is not intended to be limited to these activities; instead, any suitable number and types of activities may be used within the scope of the invention.

In the ODC/DRM schema, a "trigger" describes the environment or condition that exists when a defect appears. For example, when a defect appears during review and inspection activities, personnel map the defect to a trigger by choosing the trigger (e.g., from a predefined list of triggers) that best describes what they were thinking about when they discovered the defect. For example, when a defect appears during a test (e.g., test defects), personnel map the defect to a trigger by matching the trigger (e.g., from the predefined list) that captures the intention behind the test case or the environment or condition that served as catalyst for the failure. For example, there are twenty-one triggers defined in the ODC model, including: Design Conformance; Logic/Flow; Backward Compatibility; Lateral Compatibility; Concurrency; Internal Document; Language Dependency; Side Effect; Rare Situations; Simple Path; Complex Path; Coverage; Variation; Sequencing; Interaction; Workload/Stress; Recovery/Exception; Startup/Restart; Hardware Configuration; Software Configuration; and Blocked Test (previously Normal Mode). The invention is not intended to be limited to these triggers. Instead, any suitable number and types of triggers may be used within the scope of the invention.

In embodiments, the list of triggers used in implementations of the invention is an orthogonal list. As such, any particular defect will only accurately fit within one and only one of the triggers. In other words, each defect is counted once and only once.

In the ODC/DRM schema, triggers are mapped to activities. Table 1 gives an example of an activity to trigger mapping. However, the invention is not limited to this mapping, and any suitable mapping may be used within the scope of the invention. For example, one of the first things an organization typically does once they have decided to implement ODC is to define the activities they perform and map the triggers to those activities. Although the organization defines their activities, the organization typically does not define or redefine the triggers.

TABLE 1

| Activity | Trigger |
| --- | --- |
| Design Review/Code Inspection | Design Conformance |
| | Logic/Flow |
| | Backward Compatibility |
| | Lateral Compatibility |
| | Concurrency |
| | Internal Document |
| | Language Dependency |
| | Side Effect |
| | Rare Situations |
| Unit Test | Simple Path |
| | Complex Path |
| Function Test | Coverage |
| | Variation |
| | Sequencing |
| | Interaction |
| System Test | Workload/Stress |
| | Recovery/Exception |
| | Startup/Restart |
| | Hardware Configuration |
| | Software Configuration |
| | Blocked Test (previously Normal Mode) |

The function test activity, and activities downstream thereof, are often referred to as 'black box' testing, meaning that the manner of testing utilizes only external interfaces just as would be performed by an end-user. The focus on function testing is on the input and ensuring the output or results are as expected. Table 2 defines the triggers that are associated with function testing in accordance with aspects of the invention.

TABLE 2

| Trigger Value | Definition |
| --- | --- |
| Coverage | The test case that found the defect was a straightforward attempt to exercise code for a single function, using no parameters or a single set of parameters. Representative of a very common usage. |
| Variation | The test case that found the defect was a straightforward attempt to exercise code for a single function but using a variety of inputs and parameters. These might include invalidparameters, extreme values, boundary conditions, and combinations of parameters. |
| Sequencing | The test case that found the defect executed multiple functions in a very specific sequence. This trigger is only chosen when each function executes successfully when run independently, but fails in this specific sequence. It may also be possible to execute a different sequence successfully. |
| Interaction | The test case that found the defect initiated an interaction among two or more bodies of code. This trigger is only chosen when each function executes successfully when run independently, but fails in this specific combination. The interaction was more involved than a simple serial sequence of the executions. |

Triggers invoked during System Test are ones that are intended to verify the system behavior under normal conditions, as well as under duress. Table 3 defines the triggers that are associated with system testing in accordance with aspects of the invention.

TABLE 3

| Trigger Value | Definition |
| --- | --- |
| Workload/Stress | The system is operating at or near some resource limit, either upper or lower. Mechanisms for creating this condition include running small or large loads, running a few or many products at a time, letting the system run for an extended period of time. |
| Recovery/Exception | The system is being tested with the intent of invoking an exception handler or some type of recovery code, evaluating the ability of the system to detect an exception condition, report it, but continue to carry on. The defect would not have surfaced if some earlier exception had not caused exception or recovery processing to be invoked. From a field perspective, this trigger would be selected if the defect is in the system's or product's ability to recover from a failure, not the failure itself. |
| Startup/Restart | This trigger is similar to Recovery/Exception in that it was preceded by a serious failure. In this case, the system did not recover, and subsequent Startup or Restart also fails. The system or subsystem was being initialized or restarted following some earlier shutdown or complete system or subsystem failure. |
| Hardware Configuration | Verifying whether various hardware combinations can be installed and are able to communicate with each other and the system. The system is being tested to ensure functions execute correctly under specific hardware configurations. |
| Software Configuration | Verifying whether various software combinations can be installed and are able to communicate with each other and the system. The system is being tested to ensure functions execute correctly under specific software configurations. |

Triggers that are associated with Design Review (e.g., High Level Requirements/Design Review; Detailed Requirements/Design Review) and/or Code Inspection activities do not reflect execution of test cases, but rather capture the focus of the though process during reviews. Table 4 defines the triggers that are associated with function testing in accordance with aspects of the invention.

TABLE 4

| Trigger Value | Definition |
| --- | --- |
| Design Conformance | The document reviewer or the code inspector detects the defect while comparing the design element or code segment being inspected with its specification in the preceding stage(s). This would include design documents, code, development practices and standards, or to ensure design requirements aren't missing or ambiguous. |
| Logic/Flow | The inspector uses knowledge of basic programming practices and standards to examine the flow of logic or data to ensure they are correct and complete. Examining only the code or design, detecting a flaw in the logic or the flow. |
| Backward Compatibility | The inspector uses extensive product/component experience to identify an incompatibility between the function described by the design document or the code, and that of earlier versions of the same product or component. From a field perspective, the customer's application, which ran successfully on the prior release, fails on the current release. Ensuring that the current release of a product is consistent, especially with regard to user interfaces, with prior releases. |
| Lateral Compatibility | The inspector with broad-based experience, detects an incompatibility between the function described by the design document or the code, and the other systems, products, services, components, or modules with which it must interface. Ensuring that the component or system is following defined protocols in terms of interacting successfully with systems or components. |
| Concurrency | The inspector is considering the serialization necessary for controlling a shared resource when the defect is discovered. This would include the serialization of multiple functions, threads, processes, or kernel contexts as well as obtaining and releasing locks. |
| Internal Document | There is incorrect information, inconsistency, or incompleteness within internal documentation. Prologues, code comments, and test plans represent some examples of documentation which would fall under this category. Used when a defect record documents changes requirements or design. |
| Language Dependency | The developer detects the defect while checking the language specific details of the implementation of a component or a function. Language standards, compilation concerns, and language specific efficiencies are examples of potential areas of concern. Used when implementations of a new, unfamiliar technology or language results in syntax and compile errors. |

TABLE 4-continued

| Trigger Value | Definition |
| --- | --- |
| Side Effects | An experienced reviewer detects a problem where within a single module or component, logic is successful, but breaks a dependency with anotherbmodule, component, or system. |
| Rare Situation | A potential problem that is outside of the documented requirements and design, dealing with unusual configurations and/or usage. Flaws or omissions in error recovery would not be classified as Rare Situation. |

Figure 3:
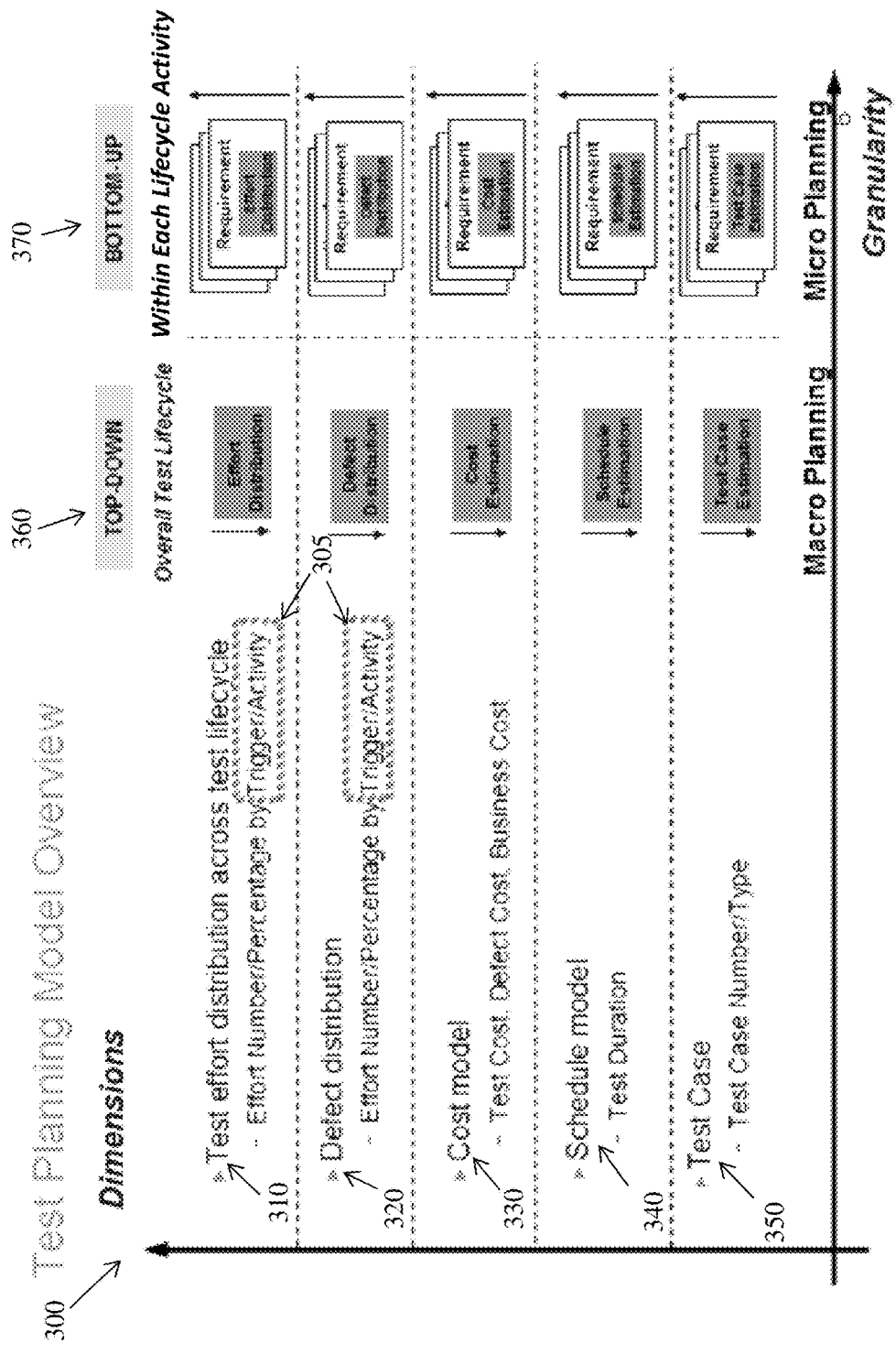
FIG. 3 shows an exemplary depiction of a high level flow in accordance with aspects of the invention.

In accordance with aspects of the invention, the TPOW 50 is based on the "structured DRM model" 300 shown in FIG. 3. In embodiments, the TPOW 50 uses the activity and trigger attributes to estimate test effort and project defect distributions across the entire project life cycle of defect removal activities. As depicted by reference number 305 in FIG. 3, the ODC/DRM activity and trigger attributes are leveraged at a high level with the structured DRM model 300.

In embodiments, the structured DRM model 300 comprises the following dimensions: test effort distribution across the test life cycle 310; defect distribution across the life cycle 320; cost modeling 330; schedule modeling 340; and test case modeling 350. However, the invention is not limited to these dimensions, and any suitable dimensions may be used within the scope of the invention.

In accordance with aspects of the invention, test effort distribution 310 and defect distribution 320 across the life cycle in the structured DRM model 300 is measured in effort divided by the percentage investment by trigger/activity. Effort may be calculated in PD (person days), or any other suitable measure.

In embodiments, cost modeling 330 across the life cycle in the structured DRM model 300 is measured in Test Cost, Defect Cost, and Business Cost. Test cost may represent, for example, the cost induced by defect removal activities, including but not limited to: understanding requirements, test assessment and planning, test design, test execution, defect reporting, retest, test tool acquirement, license costs, etc. Defect cost may represent, for example, the cost induced by defect diagnosis and resolution, and usually comes from developer or other defect resolution team. Business cost may represent, for example, the cost induced by business impact when defects show up in production.

In further embodiments, schedule modeling 340 in the structured DRM model 300 applies standard scheduling calculations around test duration to derive planning dates. Test Case modeling 350 in the structured DRM model 300 applies standard test case number and/or type calculations to provide test coverage planning information.

In accordance with aspects of the invention, the structured DRM model 300 establishes a relationship between macro planning 360 and micro planning 370 based upon the dimensions 310, 320, 330, 340, and 350. Moreover, the structured DRM model 300 utilizes defect discovery information, which is more accurate than conventional models because it is dependent on data that is available for every defect that can occur, e.g., all defects are included in the structured DRM model 300.

Figure 4:
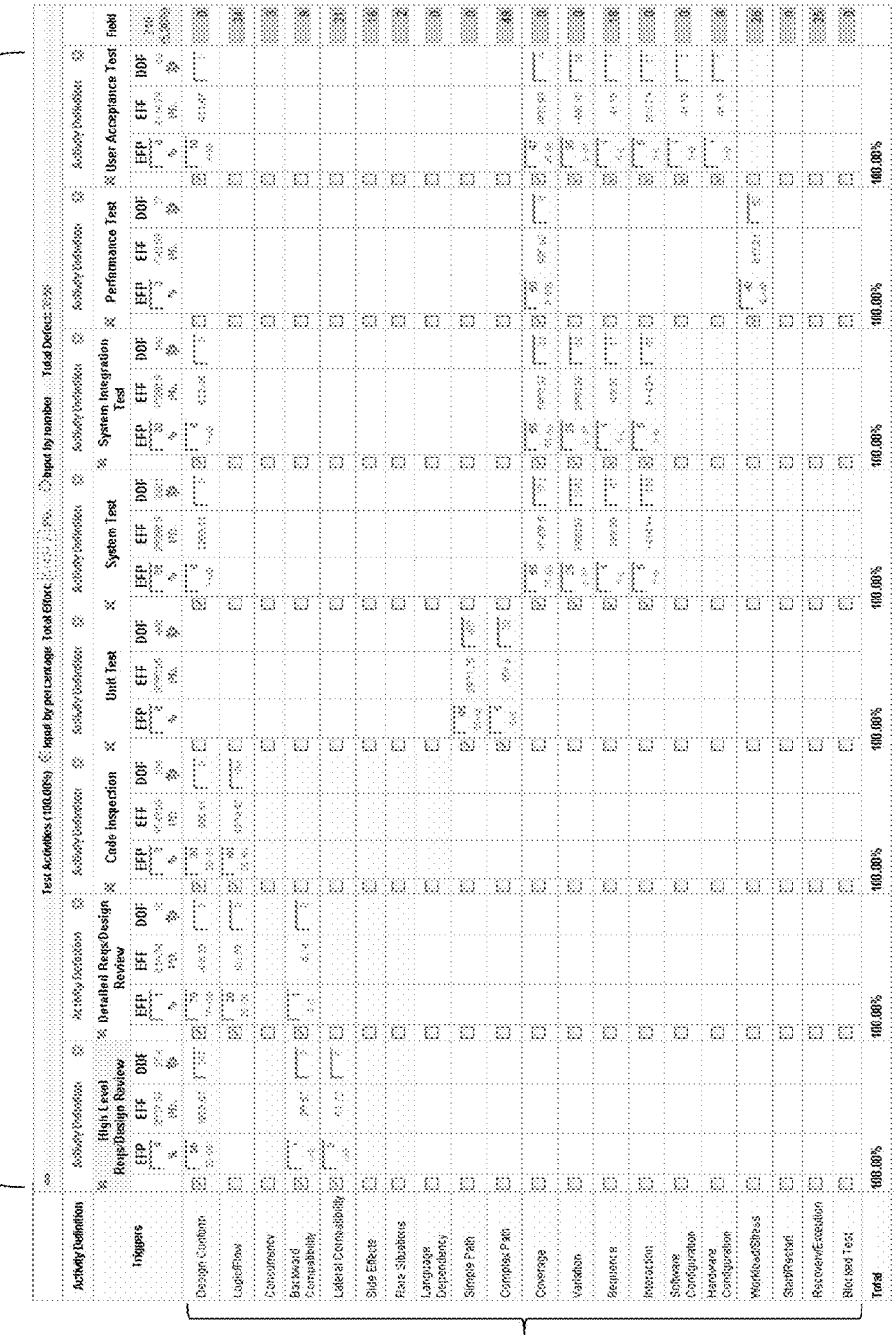
FIG. 4 shows an exemplary user interface and underlying functionality in accordance with aspects of the invention.

FIG. 4 shows an exemplary user interface (UI) 400 based on the structured DRM model 300 implemented in the TPOW 50 in accordance with aspects of the invention. The user interface 400, and all other user interfaces described herein, are merely exemplary and are provided for illustrating aspects of the TPOW 50 in accordance with aspects of the invention. The user interfaces described herein are not intended to limit the scope of the invention, and it is understood that other different interfaces may be used in implementations of the invention. The user interfaces described herein may be presented to a user with any suitable I/O device (e.g., I/O device 28 of FIG. 1). More specifically, in FIG. 4, the various ODC/DRM activities 410 are displayed in columns, and the various ODC/DRM triggers 420 are displayed in rows. As illustrated in FIG. 4, the triggers are generally ordered from top to bottom in accordance with when these triggers are experienced in the product development life cycle. Data at an intersection of a particular trigger and particular activity represents an estimation of effort or expected number of defects associated with the particular trigger and activity.

High Level Flow Diagram

Figure 5:
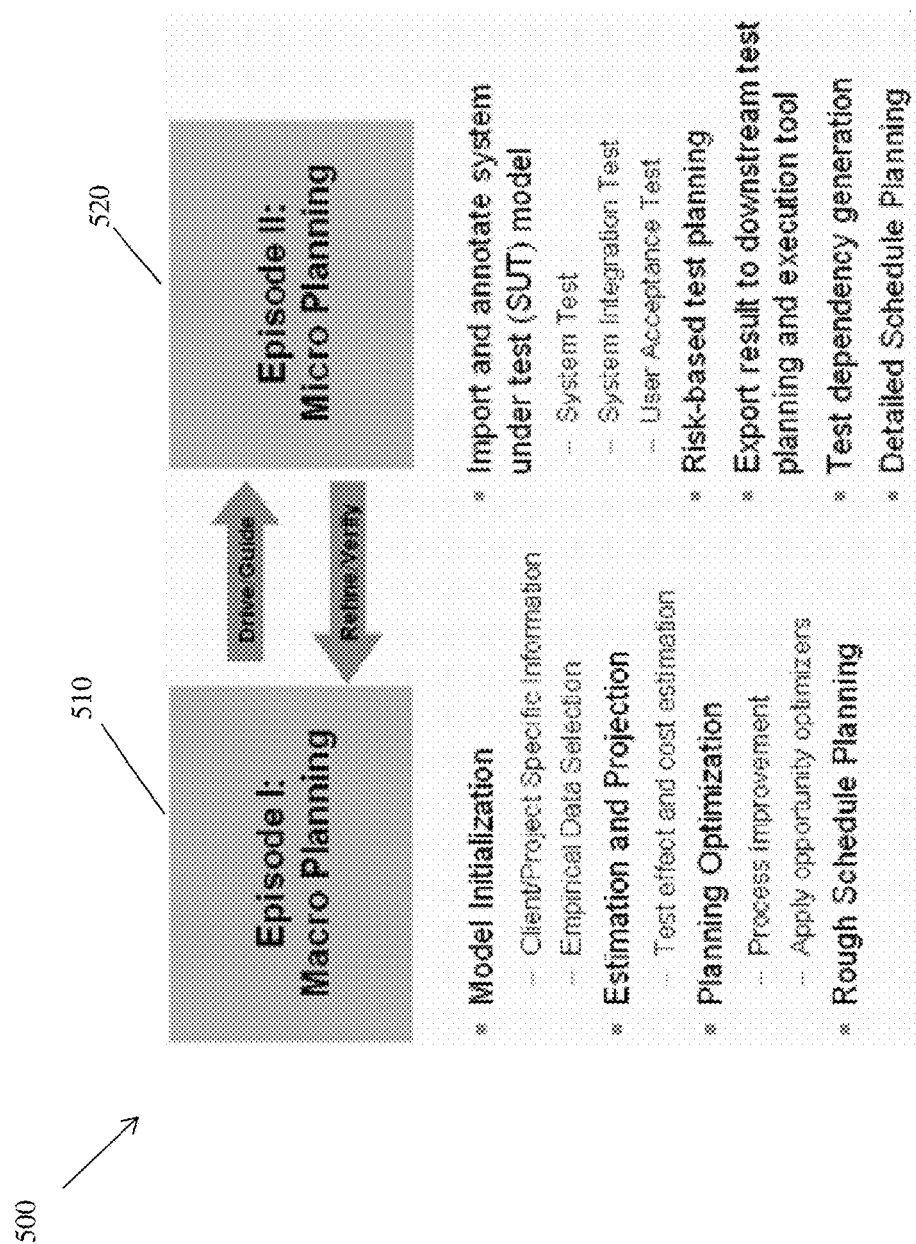
FIG. 5 illustrates a high level flow in accordance with aspects of the invention.

FIG. 5 illustrates a high level flow 500 in accordance with aspects of the invention. The steps of FIG. 5 may be implemented in the environments of FIG. 1 and/or FIG. 2, for example. As shown in FIG. 5, the flow 500 includes a step 510 comprising macro planning. In embodiments, the macro planning in the step 510 may be performed using the TPOW 50, and in particular the macro planning module 30, as described with respect to FIG. 1, and as described in greater detail herein. In embodiments, the macro planning may include, but is not limited to: model initialization (e.g., client/project specific information, and empirical data selection); estimation and projection (e.g., test effect and cost estimation); planning optimization (e.g., process improvement and applying opportunity optimizers); and rough schedule planning.

Flow 500 includes a step 520 comprising micro planning. In embodiments, the micro planning in the step 520 may be performed using the TPOW 50, and in particular the micro planning module 35, as described with respect to FIG. 1, and as described in greater detail herein. In embodiments, the micro planning may include, but is not limited to: importing and annotating the system under test (SUT) model (e.g., the System Test, System Integration Test, and User Acceptance Test); performing risk-based planning; exporting results to a downstream test planning and execution tool; generating test dependencies; and performing detailed schedule planning.

As depicted in FIG. 5, in accordance with aspects of the invention, the generated macro plan (e.g., step 510) is used to drive (e.g., guide) the generation of the micro plan (e.g., step 520). Moreover, after the micro plan is generated, it can be used to refine (e.g., verify) the macro plan. In this manner, implementations of the invention provide related and reconciled macro and micro plans.

Flow Diagrams

Figure 6:
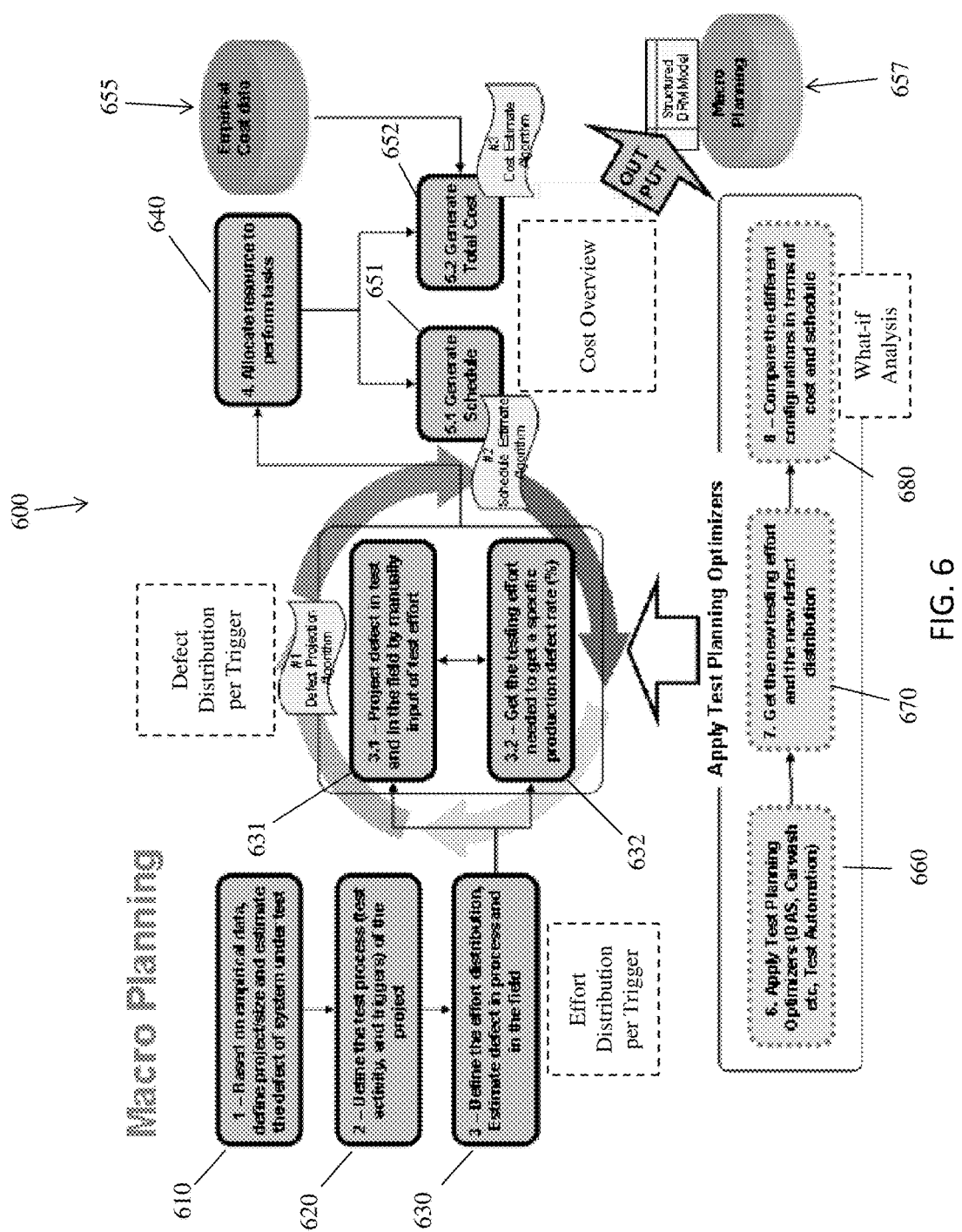
FIG. 6 illustrates a high level flow associated with macro planning in accordance with aspects of the invention.

FIG. 6 shows an exemplary flow for performing aspects of the present invention. The steps of FIG. 6, and all other flow diagrams, may be implemented in the environment of FIG. 1, for example. The flow diagrams may equally represent a high-level block diagram or a swim-lane diagram of the invention. The flowchart and/or block diagram in FIG. 6, and of other figures herein, illustrates the architecture, functionality, and operation of possible implementations of systems, methods and computer program products according to various embodiments of the present invention. In this regard, each block in the flowchart, block diagram or swim-lane diagram may represent a module, segment, or portion of code, which comprises one or more executable instructions for implementing the specified logical function(s). It should also be noted that, in some alternative implementations, the functions noted in the blocks may occur out of the order noted in the figure. For example, two blocks shown in succession may, in fact, be executed substantially concurrently, or the blocks may sometimes be executed in the reverse order, depending upon the functionality involved. Each block of each flowchart, and combinations of the flowchart illustration can be implemented by special purpose hardware-based systems that perform the specified functions or acts, or combinations of special purpose hardware and computer instructions and/or software, as described above. Moreover, the steps of the flow diagram may be implemented and executed from either a server, in a client server relationship, or they may run on a user workstation with operative information conveyed to the user workstation. In an embodiment, the software elements include firmware, resident software, microcode, etc.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

Furthermore, the invention can take the form of a computer program product accessible from a computer-usable or computer-readable medium providing program code for use by or in connection with a computer or any instruction execution system. The software and/or computer program product can be implemented in the environment of FIG. 1. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

Macro Planning

FIG. 6 illustrates a high level flow 600 associated with macro planning in accordance with aspects of the invention. The steps of FIG. 6 may be implemented in the environments of FIGS. 1 and/or 2. For example, the processes described in FIG. 6 may be performed using the TPOW 50, and in particular the macro planning module 30, as described with respect to FIG. 1.

In accordance with aspects of the invention, during the macro planning stage, a user provides data to the TPOW 50, and the TPOW 50 generates an estimated effort distribution and defect distribution for the entire testing project. In embodiments, the effort distribution and defect distribution are arranged in terms of ODC/DRM activities and triggers. In embodiments, the TPOW 50 generates the effort distribution and defect distribution using pre-defined logic, rules, and probability tables, which may be based on analysis and/or data-mining of historic data from past test projects and ODC/DRM defect analysis results, and which may be programmed into the TPOW 50 (e.g., stored in the storage system 22B of FIG. 1). In accordance with further aspects of the invention, the TPOW 50 additionally generates a high-level schedule for the testing project and a cost overview based on the effort distribution, defect distribution, and additional data provided by the user.

More specifically, at step 610, empirical data is input to the TPOW 50. The data may include, but is not limited to organizational maturity level, code size, etc. At step 620, the test processes (e.g., activities to be performed during the test) are defined. The test process may be automatically suggested by the TPOW 50 and/or may be manually defined/adjusted by a user. At step 630, the TPOW 50 automatically generates an effort distribution and a defect distribution for the project based on the data from step 610 and the activities defined in step 620. The user may perform an iterative process including at last one of: step 631 which comprises estimating a defect distribution in the test activities and the field by manually specifying a total test effort; and step 632 which comprises estimating an effort distribution in each activity required to achieve a manually specified production defect rate. At step 640, resources (e.g., test teams of people) are assigned to the activities of the test plan. At step 651, a test schedule is generated based on the effort distribution, defect distribution, and resource assignments. At step 652, a total test cost is generated based on the effort distribution, defect distribution, resource assignments, and empirical cost data 655. The output is a macro plan 657 that is based upon the structured DRM model.

Optionally, a 'what-if' analysis may be performed by applying any one or more of a number of test planning optimizers at step 660, generating new effort distribution and defect distribution based on the applied optimizer(s) at step 670, and comparing the optimized configuration to the original (e.g., non-optimized) configuration at step 680 in terms of cost and/or schedule.

More specifically, at step 610, empirical data is provided to the TPOW 50. In embodiments, the empirical data may be input by a person (e.g., an end user, a consultant or service provider assisting a customer, etc.) using an interface implemented in a computing device, such as for example, an I/O device 28 as described above with respect to FIG. 1. In embodiments, the empirical data may be any suitable data that can be used in estimating effort distribution and/or defect distribution across the lifecycle of a project. For example, in embodiments, the empirical data includes, but is not limited to, maturity level of the organization performing the test, size of code to be tested, etc. Based on the maturity level and size, the TPOW 50 estimates the total number of defects that are expected to be uncovered with respect to the System Under Test (SUT), as described in commonly assigned co-pending application Ser. No. 12/558,327, the contents of which are hereby expressly incorporated by reference in their entirety.

At step 620, the test processes are defined. In embodiments, this includes defining the activities that will be used in the macro plan. In embodiments, the TPOW 50 automatically generates a suggested test process template, including suggested test activities, based on the maturity level and size from step 610. This may be performed, for example, by the TPOW 50 utilizing predefined logic and probability tables (e.g., stored in storage system 22B of FIG. 1) that define what activities are best suited for project having the given input data (e.g., maturity level, size, etc.). In embodiments, the user is presented with the suggested test process template and has the ability to modify the activities that will be used in the macro planning.

Still referring to FIG. 6, at step 630, the TPOW 50 automatically generates an effort distribution and a defect distribution for the project. In embodiments, step 630 may also include permitting the user to input a constraint that further affects the generation of the effort distribution and a defect distribution. In further embodiments, step 630 may additionally include permitting the user to adjust calculated values of the generated effort distribution and/or defect distribution, which causes the TPOW 50 to recalculate the effort distribution and/or defect distribution based on the adjusted values.

In accordance with aspects of the invention, the effort distribution comprises a calculated value associated with each activity (e.g., the activities defined in step 620), which value represents an estimated amount of effort (e.g., person days) that will be required to complete the activity during the test. In embodiments, the estimated effort for each activity is further broken down into effort associated with each trigger in that activity.

In accordance with further aspects of the invention, the defect distribution comprises a calculated value associated with each activity (e.g., the activities defined in step 620), which value represents an estimated number of defects that will be uncovered and handled during that activity of the test. In embodiments, the estimated number of defects for each activity is further broken down into estimated number of defects associated with each trigger in that activity.

In accordance with aspects of the invention, the effort distribution and defect distribution are generated by the TPOW 50 using logic, rules, and probability tables, and are based on the data from steps 610 and 620 and the user-defined constraint provided in step 630. For example, the logic, rules, and probability tables may be based on analysis and/or data-mining of historic data from past test projects and ODC/DRM defect analysis. More specifically, for a project having a particular organizational maturity level, code size, and group of activities, trends about where defects are most likely to happen (e.g., which activities and triggers) and how much effort is required for each activity and trigger may be gleaned from historic data and programmed into logic, rules, and probability tables of the TPOW 50. Then, given the set of data for the current project (e.g., organizational maturity level, code size, and group of activities), the TPOW 50 may use the logic, rules, and probability tables to estimate an effort distribution and defect distribution.

In embodiments, the constraint provided in step 630 may comprise a user input value of total effort (e.g., in person days) for the entire test (e.g., all activities). Alternatively, the constraint provided in step 630 may comprise a user-input value related to a quality goal (e.g., a maximum production defect percentage). The user-defined constraint further influences how the TPOW 50 calculates the effort distribution and defect distribution in step 630.

For example, a constraint regarding a maximum total project effort (e.g., 1500 person days) means that the effort distribution is calculated such that the sum of effort for all activities does not exceed the total effort. This may in turn affect the defect distribution, for example, resulting in an estimation of less total defects handled during testing (e.g., the activities) and more defects pushed into production (e.g., the field).

Conversely, a user-defined constraint regarding a maximum production defect percentage affects the defect distribution by limiting how many defects are permitted to be estimated as production (e.g., field) defects. This may, for example, increase the number of defects associated with one or more activities, which may in turn affect (e.g., increase) the effort distribution Still referring to FIG. 6, at step 640, resources are allocated to perform tasks associated with the activities of the test plan. In embodiments, a resource represents something that performs a task. For example, a resource may be a person, a team of people, a computing resource, etc.

In embodiments, a global resource model (e.g., database) is pre-populated with data identifying numerous resources. In step 640, resources are selected from the global resource model and assigned to respective activities (e.g., System Test, Code Inspection, etc.) for handling the estimated effort associated with the respective activities. The resources may be selected manually be the user via a user interface, for example, by browsing and/or searching the global resource model.

Additionally or alternatively, the TPOW 50 may automatically suggest resources based on a predefined test competency model that matches predefined attributes of the resources in the global resource model with attributes of the activities to be performed. In embodiments, attributes associated with resources and defined in the global resource model may include, for example, skills, language, billing rate, efficiency, geographic location, etc. Methods and systems for modeling and simulating resources, such as those described with respect to step 640, are described in commonly assigned co-pending application Ser. No. 12/558,263, the contents of which are hereby expressly incorporated by reference in their entirety.

In further embodiments, the test competency model describes and captures the association of the assigned testing resources with the activities. For example, the test competency model may describe an "availUnitPercentage" for an assigned resource, which represents what percentage of work in a particular activity (e.g., System Test) is allocated to the assigned testing resource. For example, a single resource may be assigned to perform 100% of the work in one test activity. Alternatively, implementations of the invention also support a scenario where several testing resources together perform the one test activity, e.g., where the sum of all testing resources assigned to an activity equals 100%. In additional embodiments, the test competency model may describe an "efficiency" for an assigned resource, which represents how efficiently the resource (e.g., test team) can perform the test activity. The efficiency may be based on empirical (e.g., historical) data associated with the particular resource, where any suitable value may be assigned based on an assessment of the test team.

Still referring to FIG. 6, at step 651, a test schedule is generated based on the effort distribution, defect distribution, and resource assignments. In embodiments, the TPOW 50 is programmed with scheduling logic that takes into account the effort distribution (e.g., how many person days are allocated to each activity) and resource assignments (which people are assigned to which activity), and creates a testing schedule for the resources. The schedule may be defined in terms of triggers, and may also take into account any constraints such as Unit Test activities are to be completed before System Test activities begin.

At step 652 a total test cost is generated based on the effort distribution, defect distribution, resource assignments, and empirical cost data 655. In embodiments, the TPOW 50 is programmed with cost estimation logic that takes into account the effort distribution (e.g., how many person days are allocated to each activity) and resource assignments (which people are assigned to which activity), empirical cost data (e.g., the billing rate for assigned resources, etc.), and generates total test cost for the test plan. The cost estimation logic may also take into account empirical cost data that defines the cost to fix a defect at any time (e.g., activity) in the process. For example, the cost to fix a defect typically increases exponentially with time after the Unit Test, and such defect-cost-versus-time data may be predefined in the empirical cost data 655. In this manner, the TPOW 50 may further refine the total test cost based on a defect fix cost based on the defect distribution. Additionally, the cost estimation logic may apply any business cost rules that are defined in the empirical cost data 655. In this manner, the TPOW 50 may generate a total cost that is made up of a test cost, defect fix cost, and business cost. Of course, the invention is not limited to these types of costs, and any desired costs may be used within the scope of the invention.

The steps of FIG. 6 are further described herein with respect to FIGS. 7-13, which show exemplary user interfaces and underlying functionality of an exemplary implementation of a TPOW 50 in accordance with aspects of the invention. It is to be understood that the invention is not limited by the graphical user interfaces shown in FIGS. 7-13, and that the invention may be implemented in other manners not depicted in FIGS. 7-13.

Figure 7:
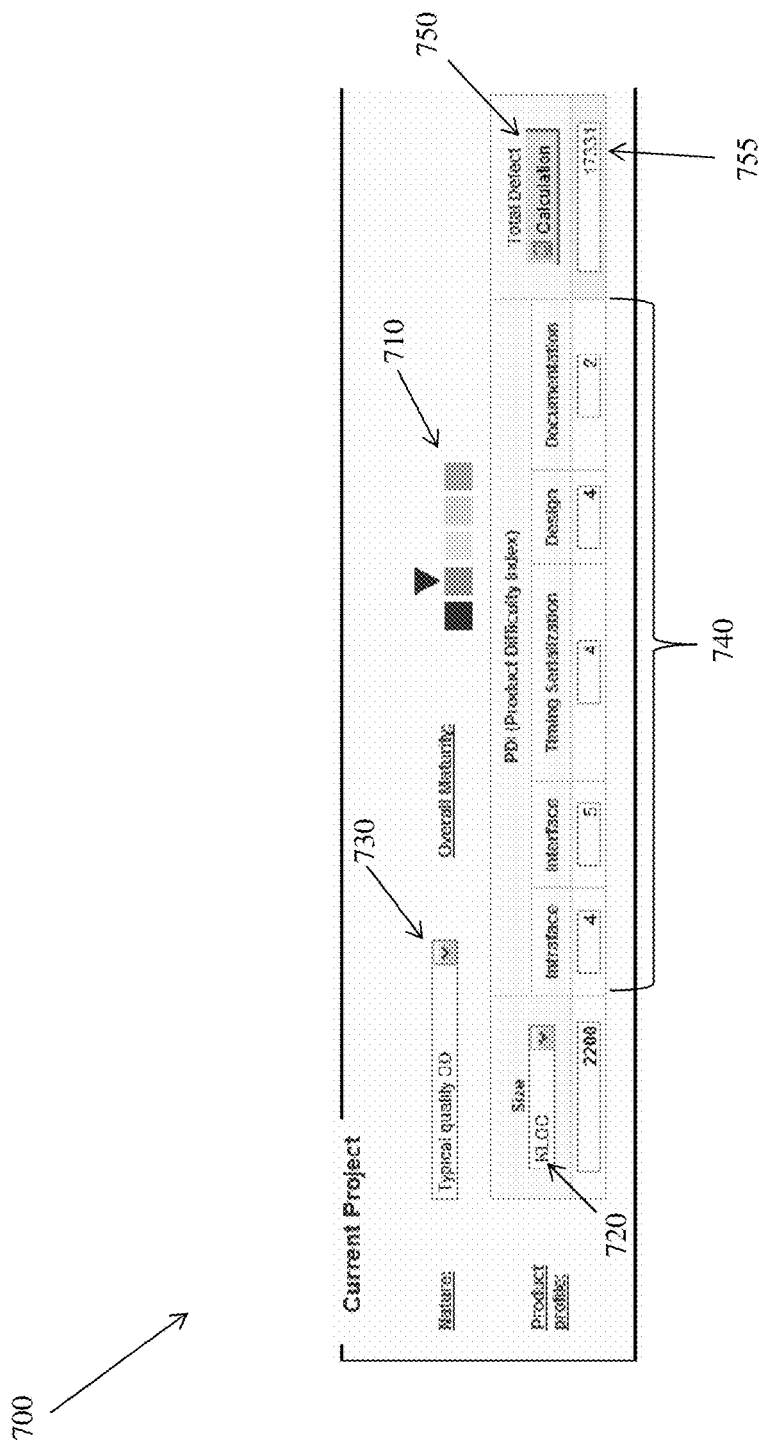

For example, FIG. 7 shows an exemplary user interface 700 of an implementation of a TPOW 50 in which a user enters empirical data associated with step 610. Using the interface 700, a person may select a maturity level 710 for the organization. The interface 700 also permits a user to select a definition for project size, e.g., KLOC (thousand lines of code) or some other predefined metric, from a drop-down menu 720, and input a quantitative value for the project size in an input field 725. In embodiments, the interface 700 also permits a user to select a nature of the project from a drop down menu 730, which contains predefined selections relating to the type and/or technology of the code being tested. In further embodiments, the interface 700 may provide the user with input fields 740 for inputting qualitative values relating to various parameters associated with a PDI (Product Difficulty Index). The PDI parameters may include, but are not limited to: Intraface, Interface, Timing Serialization, Design, and Documentation. Additionally, the interface 750 may include a field (e.g., click button) 750 that a user can select to cause the TPOW 50 to estimate the total number of expected defects 755 for the project based on whatever data has been input into the various fields of the interface 700.

Figure 8:
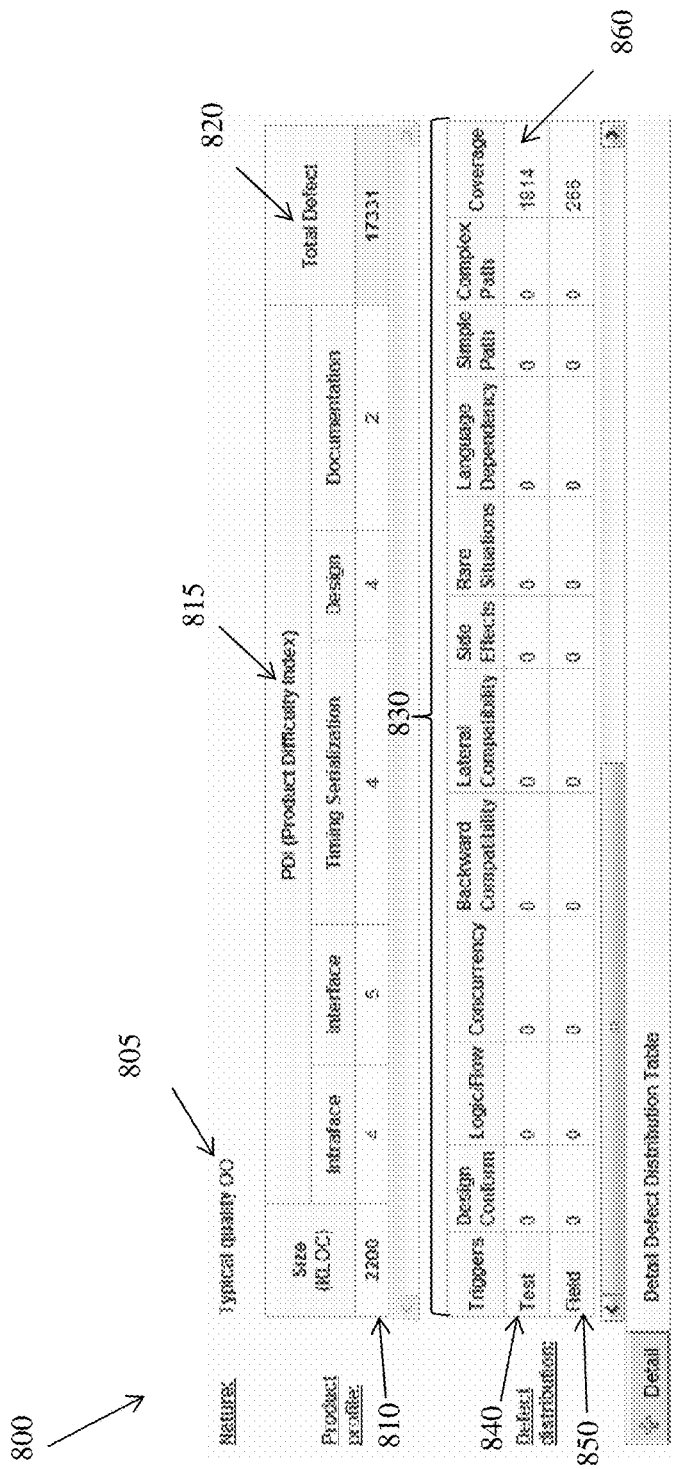

FIG. 8 shows another exemplary user interface 800 of an implementation of a TPOW 50 that is automatically generated by the TPOW 50 based on the data described above with respect to FIG. 7. In embodiments, the interface 800 displays the input data, such as nature 805, size 810, PDI values 815, and estimated total number of defects 820. In embodiments, the interface 800 also displays an estimated defect distribution chart that shows the number of defects broken out according to triggers 830 and whether the defects will be found during test 840 or in the field 850. For example, cell 860 indicates that 1814 defects classified in the coverage trigger are expected to be found during testing of the SUT. The defect distribution generated by the TPOW 50 at step 610 is a preliminary estimate, and will be refined in subsequent steps as described herein.

Figure 9:

FIG. 9 shows an exemplary user interface 900 of an implementation of a TPOW 50 in which automatically suggested test activities 910 (e.g., ODC/DRM activities), as described with respect to step 620, are displayed to the user. In embodiments, the user may unselect any of the suggested activities using a check box field 920 associated with each individual activity. Optionally, the user may cause the TPOW 50 to refine the automatically suggested test activities 910 by selecting one or more filters from one or more drop down menus 930, 935, 940 containing predefined lists of filters. In embodiments, the filters are related to, for example, the type of industry of the SUT, the maturity level, and the test owner, and provide further data with which the TPOW 50 uses predefined logic and probability tables to automatically generate suggested test activities 910.

Figure 10:
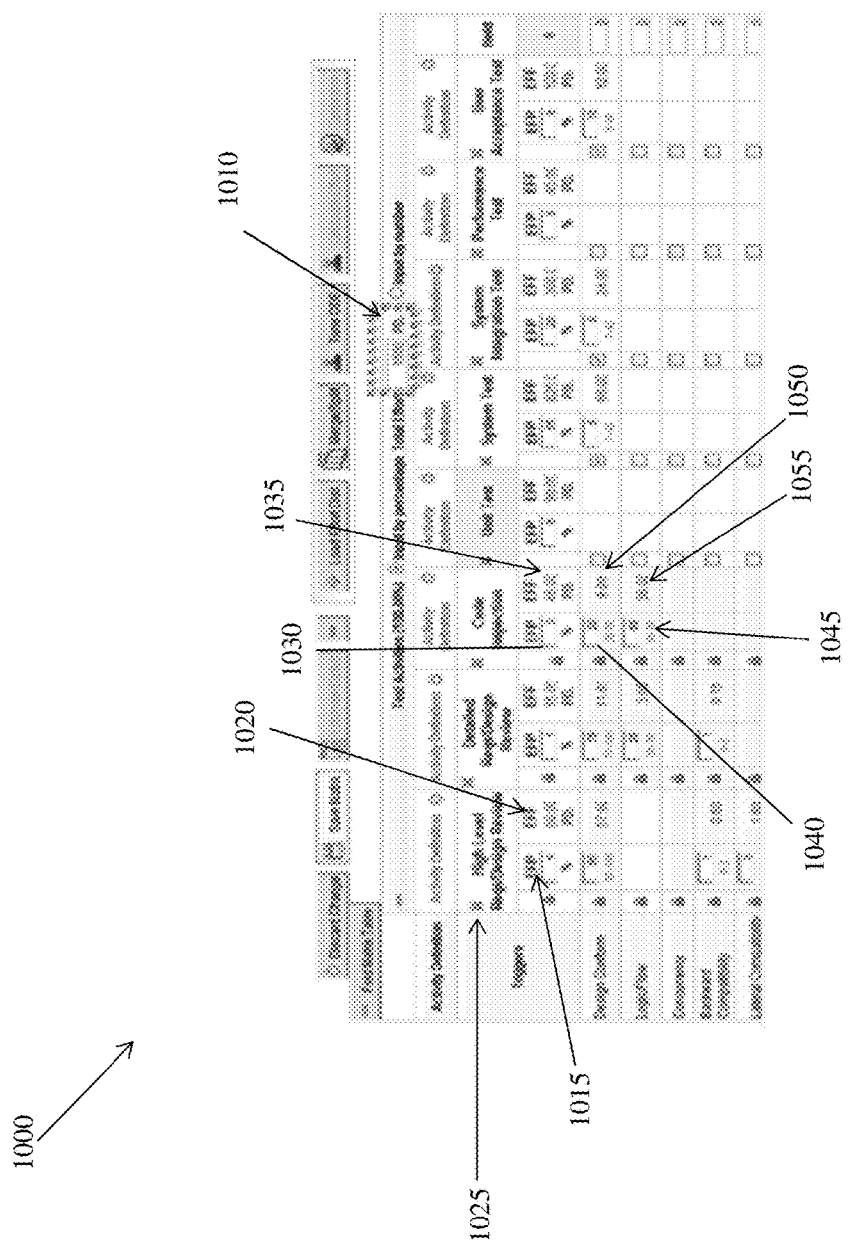

For example, FIG. 10 shows an exemplary user interface 1000 of an implementation of a TPOW 50 in which a user has input a constraint associated with total effort, e.g., 1500 person days (PD), in cell 1010. Based on this constraint, the data from steps 610 and 620 (e.g., maturity level, size, defined activities, etc.), and the programmed logic, rules, and probability tables, the TPOW 50 generates an effort distribution. In embodiments, the effort distribution includes an EFP (Effort Percentage) 1015 and EFF (Effort Number) 1020 for each activity 1025. For example, the value "3" in cell 1030 means that three percent of the total effort for the project is estimated (e.g., suggested by the TPOW 50) to be spent in the activity of Code Inspection. In embodiments, the TPOW 50 is programmed such that the sum of the EFP for all activities equals 100%. Still referring to the interface 1000, cell 1035 indicates that "45.00" PD (e.g., 1500 total PD from cell 1010 times 3% from cell 1030) are estimated to be spent performing the Code Inspection activity.

Still referring to the interface 1000, the effort distribution is further broken down into the triggers associated with each activity. For example, cell 1040 indicates that 20% of the effort of the Code Inspection activity is estimated (e.g., suggested by the TPOW 50) for handling issues associated with the Design Conform trigger. Additionally, cell 1045 indicates that 80% of the effort of the Code Inspection activity is estimated for handling issues associated with the Logic Flow trigger. In embodiments, the TPOW 50 is programmed such that the sum of the EFP for all triggers in a single activity (e.g., Code Inspection) equals 100%. As further depicted in FIG. 10, cell 1050 indicates that "9.00" PD of effort (e.g., 20% from cell 1040 times 45.00 PD from cell 1035) is estimated as being associated with the Design Conform trigger during the Code Inspection activity, and cell 1055 indicates that "36.00" PD of effort (e.g., 80% from cell 1045 times 45.00 PD from cell 1035) is estimated as being associated with the Logic Flow trigger during the Code Inspection activity.

In embodiments, the user may adjust the value of the total effort in cell 1010, and the TPOW 50 will recalculate the effort distribution based on the new value of total effort. Additionally or alternatively, the user may adjust one or more of the EFP cells (either at the activity level or trigger level within an activity), and the TPOW 50 will recalculate the effort distribution based on the new value(s). In embodiments, the EFP values may only be changed within a predefined range determined by the TPOW 50 based on the programmed logic, rules, and probability tables.

Figure 11:
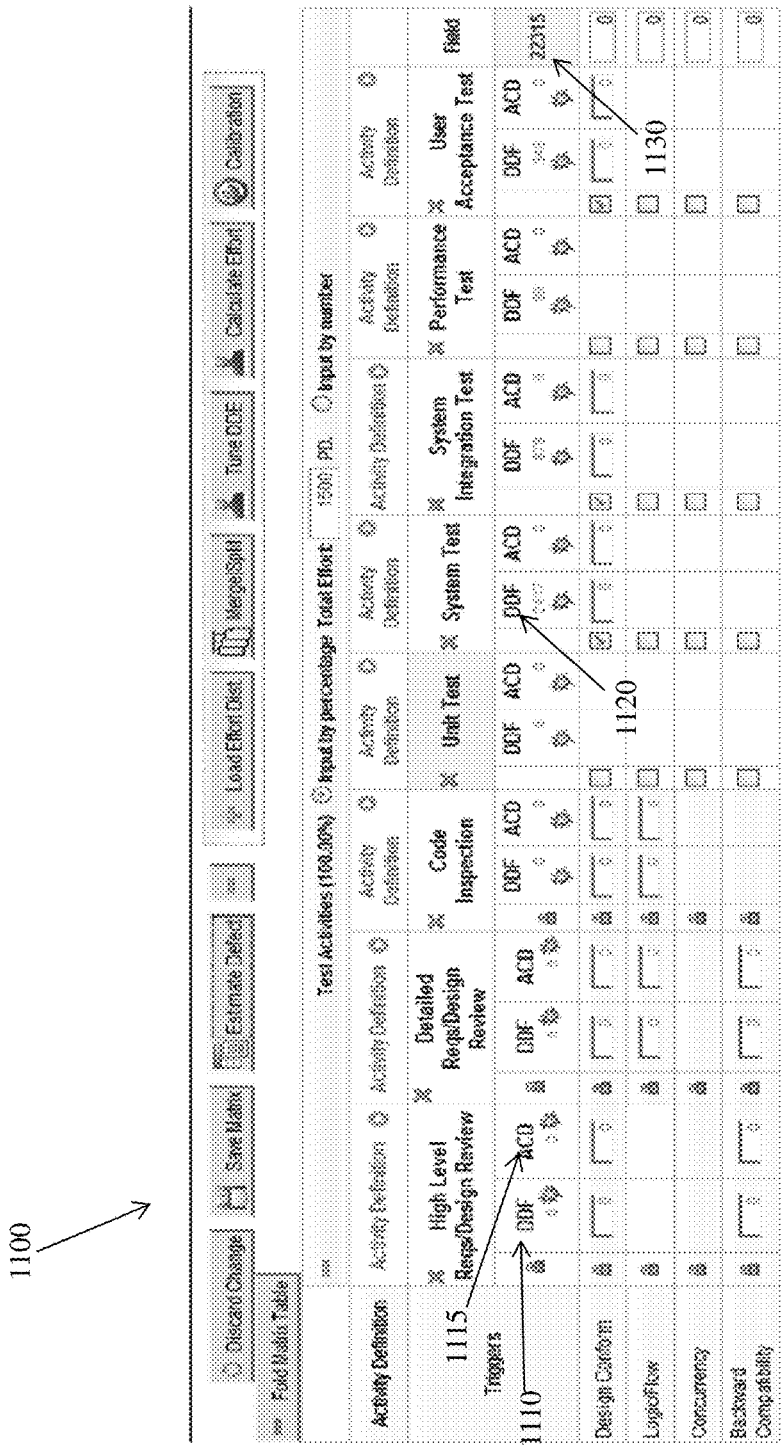

FIG. 11 shows an exemplary user interface 1100 of an implementation of a TPOW 50 depicting an exemplary defect distribution generated in accordance with aspects of the invention. In the interface 1100, each activity has an estimated value of DDF (Discovered Defect) 1110 and a value of ACD (Actual Defect) 1115. For example, the activity System Test has a DDF value of 2417 (e.g., cell 1120), which indicates that 2147 defects are estimated by the TPOW 50 to be uncovered during the System Test activity. Cell 1130 indicates that 22315 defects are estimated to be discovered in production (e.g., in the field, after testing has completed).

Figure 12:
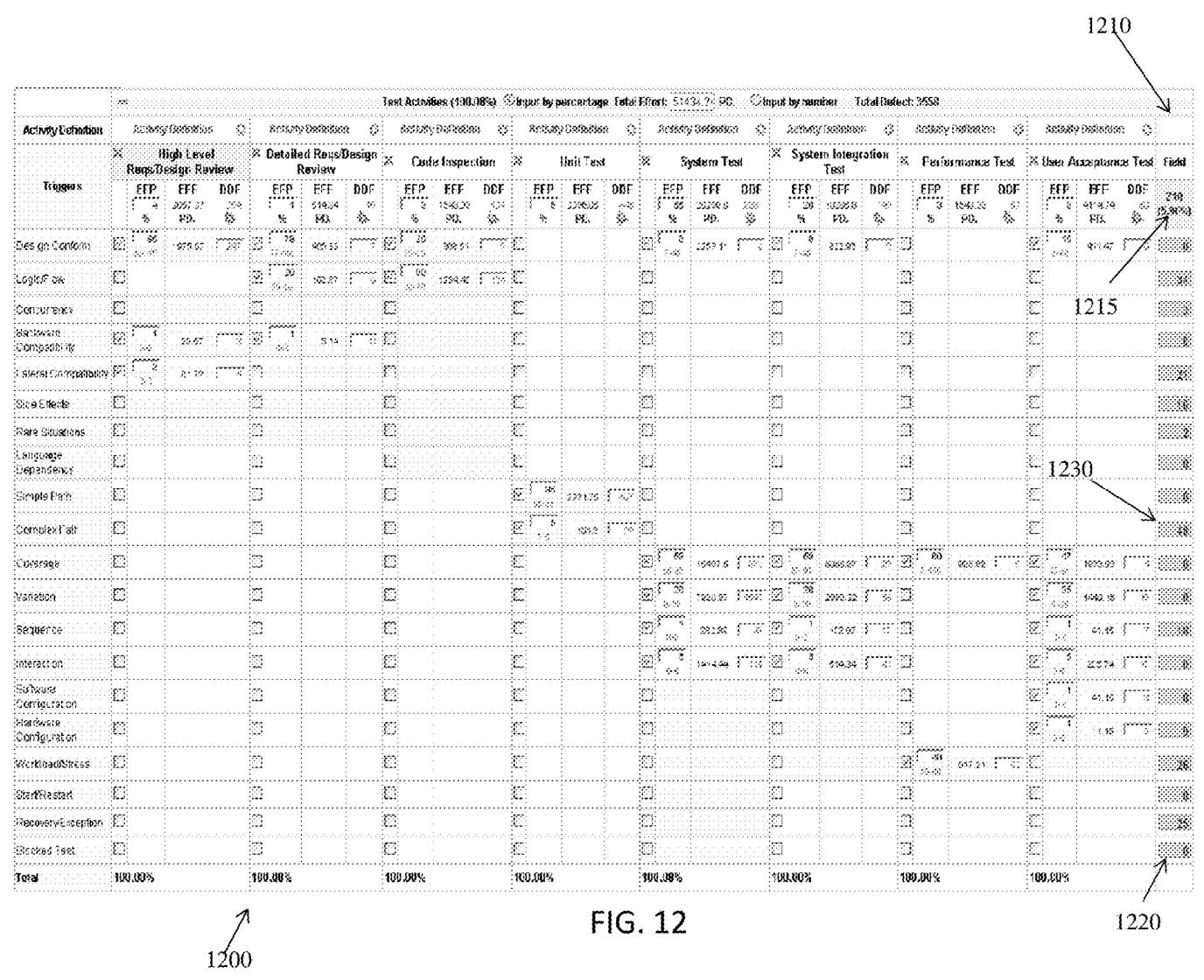

FIG. 12 shows an exemplary user interface 1200 of an implementation of a TPOW 50 depicting a combined effort distribution and defect distribution generated in accordance with aspects of the invention. In embodiments, in step 630, the effort distribution is generated first (e.g., as already described), and then the defect distribution is generated based on the effort distribution. The EFP, EFF, and DDF shown in interface 1200 are similar to that described with respect to FIGS. 10 and 11.

In embodiments, the interface 1200 also includes a "Field" column 1210 which indicates a number of defects that are estimated to be found in the field (e.g., in production after testing is complete). A total number of estimated field defects is provided in cell 1215, and an estimated number of field defects per trigger is provided in cells 1220. The estimated field defects are generated by the TPOW 50 as part of the effort distribution and defect distribution (e.g., based upon the input data, any user defined constraints, and the programmed logic, rules, and probability tables). In this manner, the TPOW 50 provides a powerful planning tool that allows a user to predict what types of resources will be needed on hand after a product is released. For example, in the example depicted in FIG. 12, cell indicates 1230 indicates that the most field defects will be associated with the Complex Path trigger. Accordingly, a manager may utilize this information to staff a production troubleshooting team with people capable of handling issues associated with the Complex Path trigger.

Figure 13:
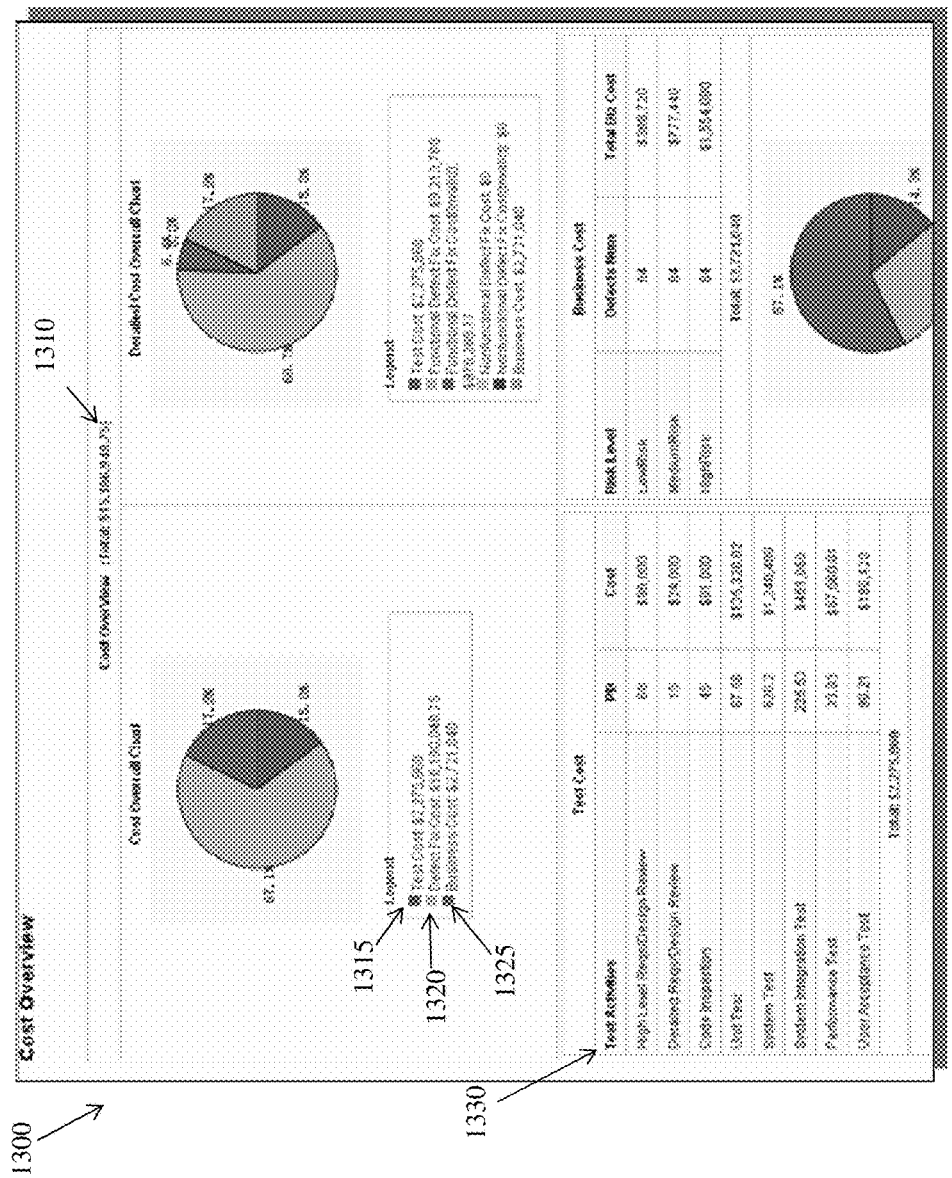

FIG. 13 shows an exemplary cost overview 1300 generated using an implementation of a TPOW 50 in accordance with aspects of the invention. In embodiments, the cost overview 1300 shows calculated data such as a total project cost 1310. The cost overview 1300 may also shows a breakdown of the total project cost into subcategories such as test cost 1315, defect fix cost 1320, and business cost 1325. The cost overview 1300 may also shows a subcategory (e.g., test cost) broken down by activities 1330. It is to be understood that the invention is not limited by the exemplary cost overview depicted in FIG. 13, and any suitable data presentation may be utilized within the scope of the invention.

Micro Planning

Figure 14:
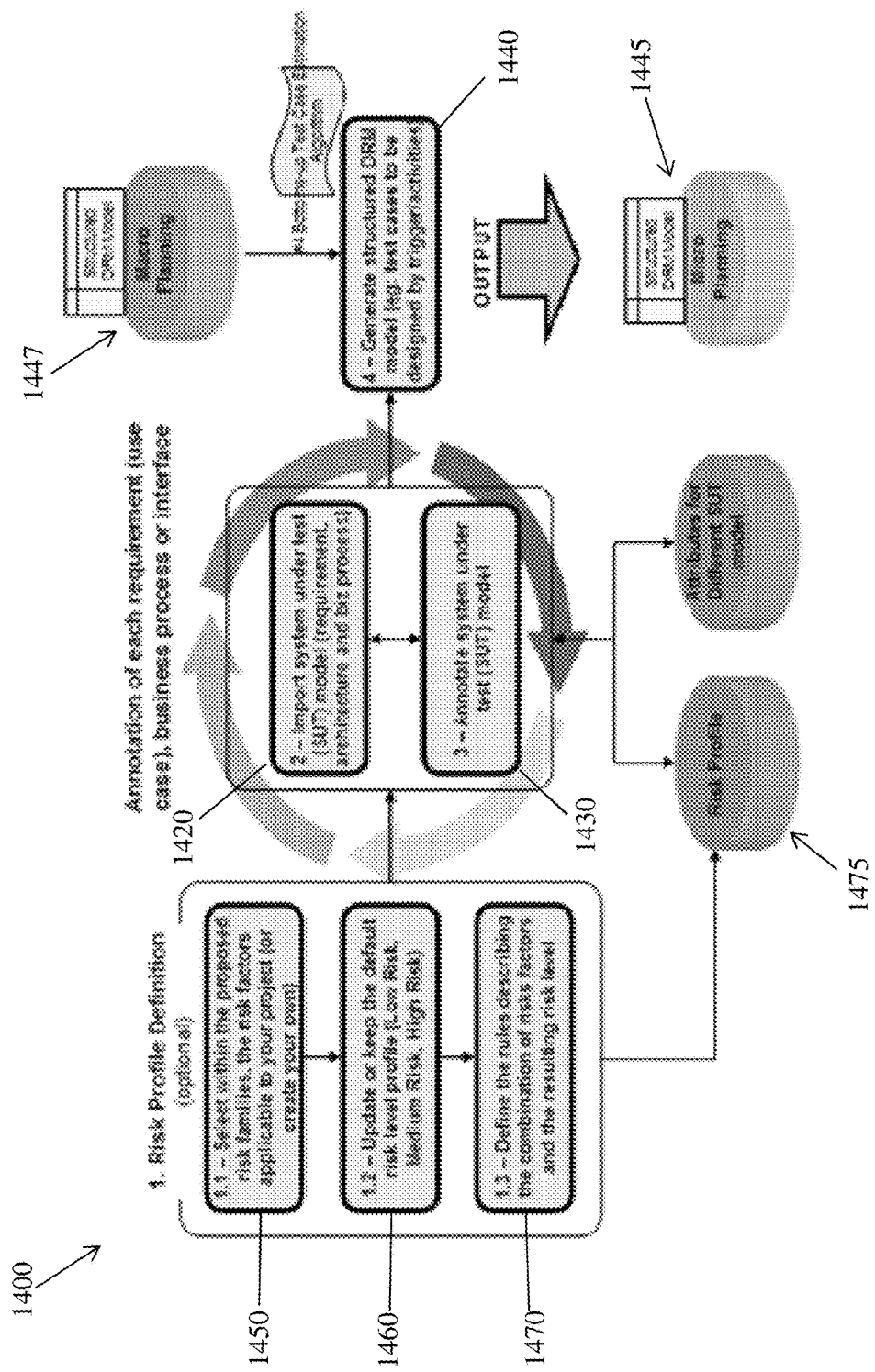
FIG. 14 illustrates a high level flow associated with micro planning in accordance with aspects of the invention.
Figure 15:
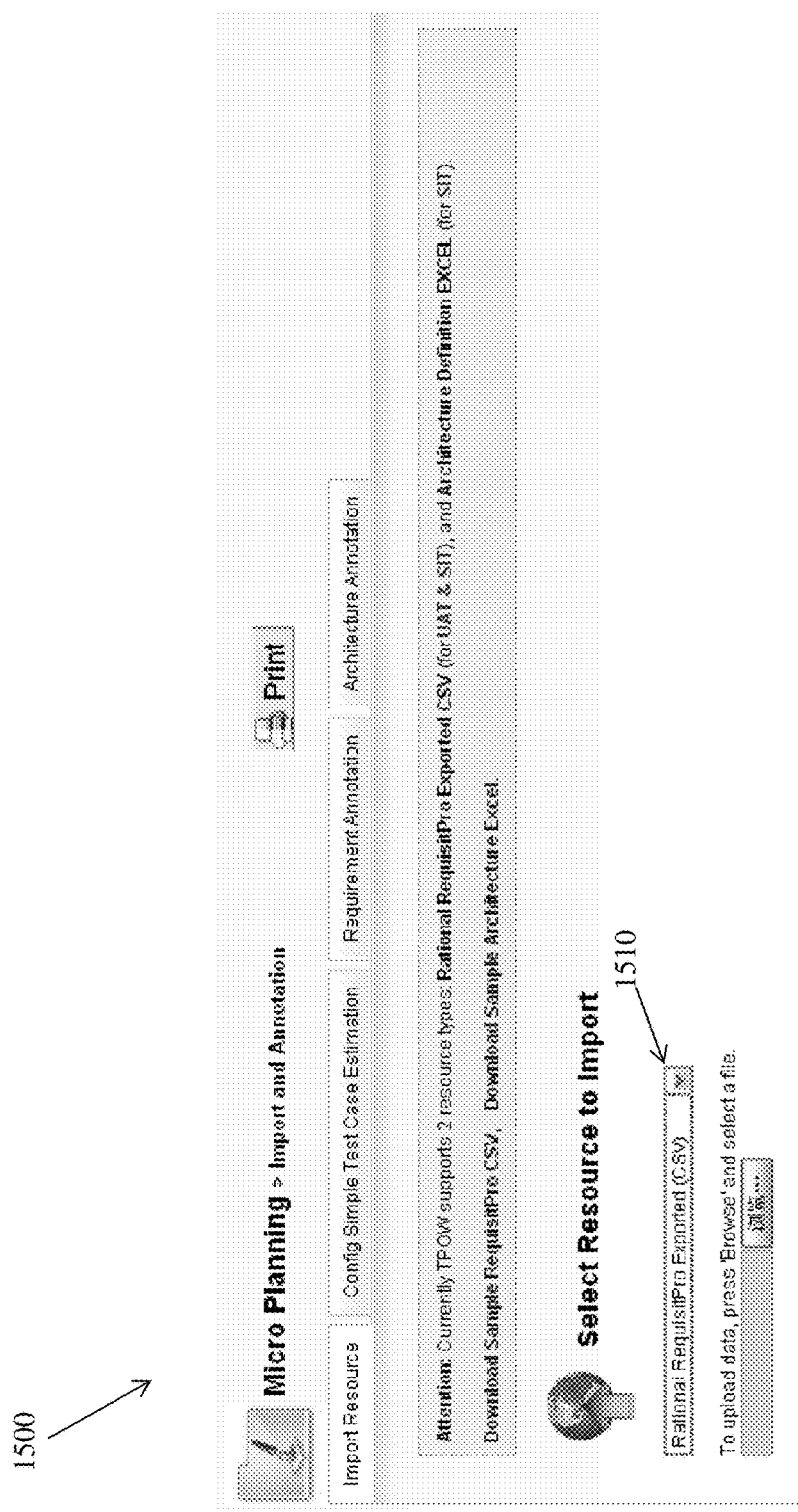

FIG. 14 illustrates a high level flow 1400 associated with micro planning in accordance with aspects of the invention. The steps of FIG. 14 may be implemented in the environments of FIGS. 1 and/or 2. For example, the processes described in FIG. 14 may be performed using the TPOW 50, and in particular the micro planning module 35, as described with respect to FIG. 1.

Micro planning is based on a bottom-up approach, and in embodiments involves creating a plan for actual test cases that will be used to test the system. In embodiments, the TPOW 50 receives requirements data related to the testing project (e.g., step 1420), constructs a system under test (SUT) model, permits a user to annotate the SUT model (e.g., step 1430), and automatically generates a structured DRM model 1445 including an estimated number of test cases to be designed for the testing project (e.g., step 1440). In embodiments, the test cases are arranged in terms of ODC/DRM activities and triggers. In embodiments, the TPOW 50 generates the estimated test case distribution using pre-defined logic, rules, and probability tables, which may be based on analysis and/or data-mining of historic data from past test projects and ODC/DRM defect analysis, and which may be programmed into the TPOW 50 (e.g., stored in the storage system 22B of FIG. 1). In further embodiment, the micro plan may be generated using at least some of the information from the already generated macro plan 1447 (e.g., described above with respect to FIGS. 6-13).

In embodiments, a user may optionally define a risk profile, as set forth in steps 1450, 1460, and 1470. In embodiments, the risk profile data may be stored in a risk profile data storage 1475, and may be used in conjunction with steps 1420 and 1430. More specifically, at step 1450, a user may select, within proposed (e.g., pre-defined) risk families, any risk factors that are applicable to the current testing project. Additionally or alternatively, the user may create their own risk family definitions. At step 1460, a user may update and/or keep the default risk level profile (Low Risk, Medium Risk, High Risk). At step 1470, a user may define rules describing combinations of risks factors and a resulting risk level. Steps 1450, 1460, and 1470 may be performed in accordance with the techniques described in commonly assigned co-pending application Ser. No. 12/558,147, the contents of which are hereby expressly incorporated by reference in their entirety.

The steps of FIG. 1400 are further described herein with respect to FIGS. 15-22, which show exemplary graphical user interfaces of an exemplary implementation of a TPOW 50 in accordance with aspects of the invention. It is to be understood that the invention is not limited by the graphical user interfaces shown in FIGS. 15-22, and that the invention may be implemented in other manners not depicted in FIGS. 15-22.

More specifically, at step 1420, test requirements data is imported by the TPOW 50. This is described with reference to FIG. 15, which show an exemplary user interface 1500 for importing requirements data into the TPOW 50. Typically, requirements and design information are stored in an architecture document. An architecture document commonly contains information associated with requirements, use cases, and test cases, all of which are known such that further explanation is not believed necessary. There are numerous planning tools that currently exist for capturing, arranging, and storing this information, such as, for example, Rational ReqPro, HP Quality Center, RQM, etc.

In embodiments, the TPOW 50 contains program logic that maps the respective formats of numerous conventional architecture documents to a system under test (SUT) model. In this manner, a user may use the interface 1500 to select a particular format from a drop down menu 1510 and import the requirements data stored in a file of that format into the TPOW 50. In further embodiments, the TPOW 50, via the user interface 1500, permits a user to import plural architecture documents, which may be of different formats, and consolidates the architecture documents into a single SUT model. Importing and mapping documents of a first format into a model having a second format is known, such that further explanation is not believed necessary.

At step 1430, the TPOW 50 permits a user to annotate the SUT model that was created in step 1420. In accordance with aspects of the invention, the purpose of micro planning is to estimate test cases in a bottom-up manner. Often the SUT model created in step 1410 is not complete enough (e.g., does not have sufficient data) at this stage in the project life cycle to accurately estimate test cases. Accordingly, in embodiments, the TPOW 50 is programmed with logic that permits a user to annotate the SUT model by providing information including, but not limited to: a value associated with each related risk factor in order to determine the level of risk (e.g., profile), complexity, dependencies, and any other information required for determining a number of test cases to be designed.

Figure 16:
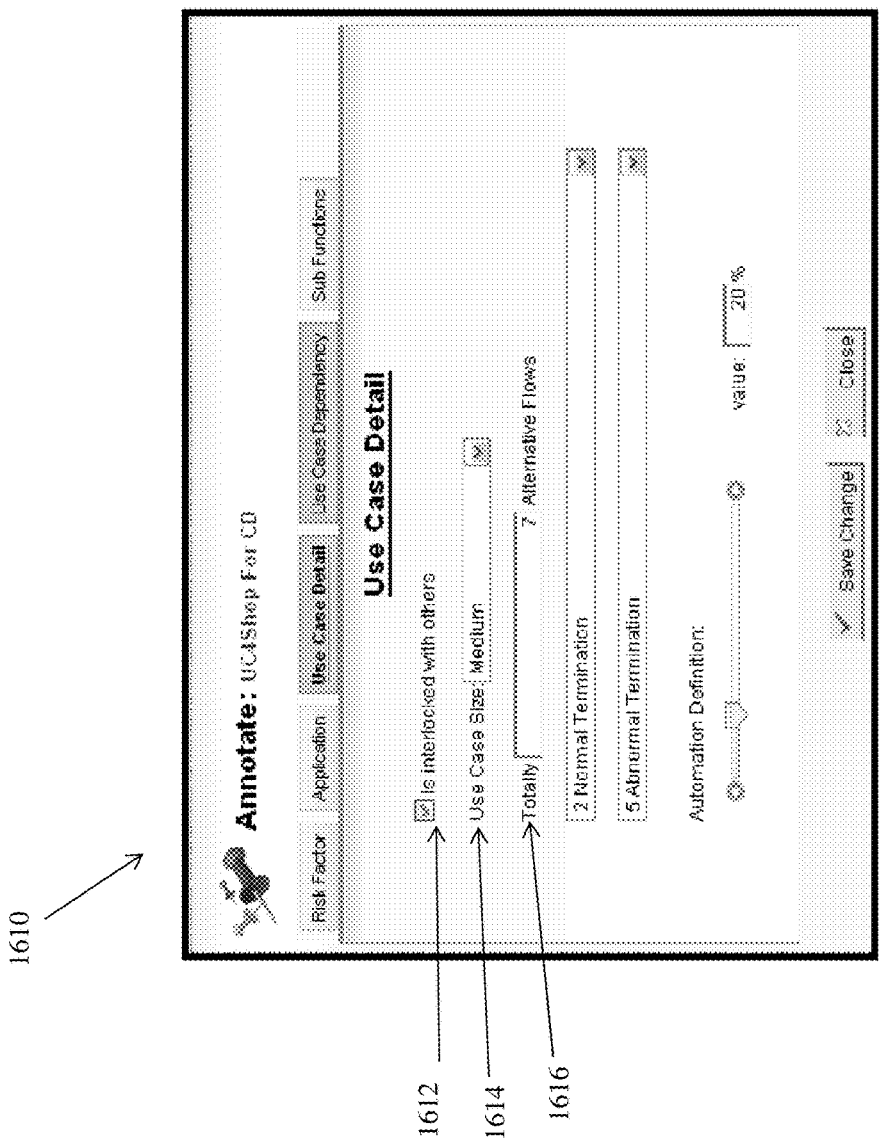

FIGS. 16-20 depict exemplary user interfaces 1610, 1620, 1630, 1640, and 1650 for making annotations in accordance with aspects of the invention. FIG. 16 shows a user interface (UI) 1610 that permits a user to annotate details of a use case that is part of the SUT model. For example, a user may specify whether the particular use case is interlocked with others at 1612, the use case size at 1614, and the number of alternative flows at 1616.

Figure 17:
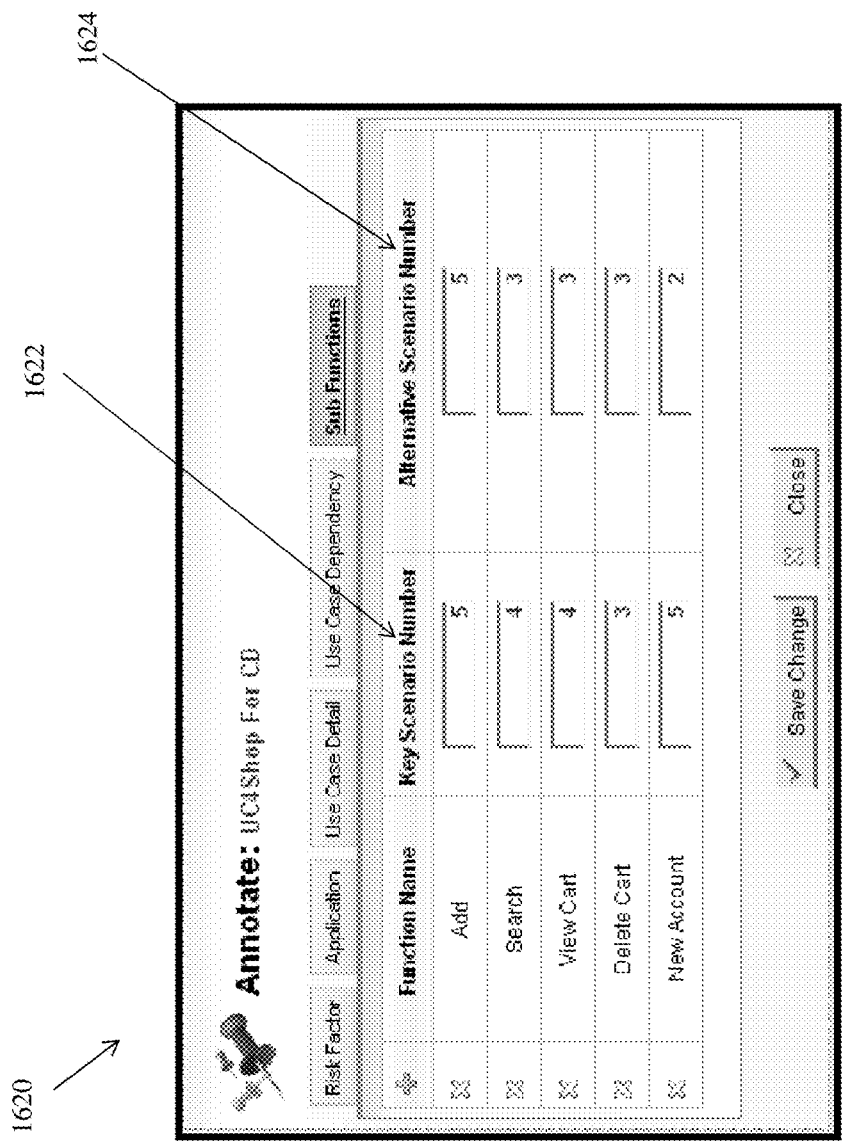

FIG. 17 shows a user interface (UI) 1620 that permits a user to annotate dependency information of a use case that is part of the SUT model. For example, a user may specify a Key Scenario Number for the use case at 1622 and an Alternative Scenario Number for the use case at 1624.

Figure 18:
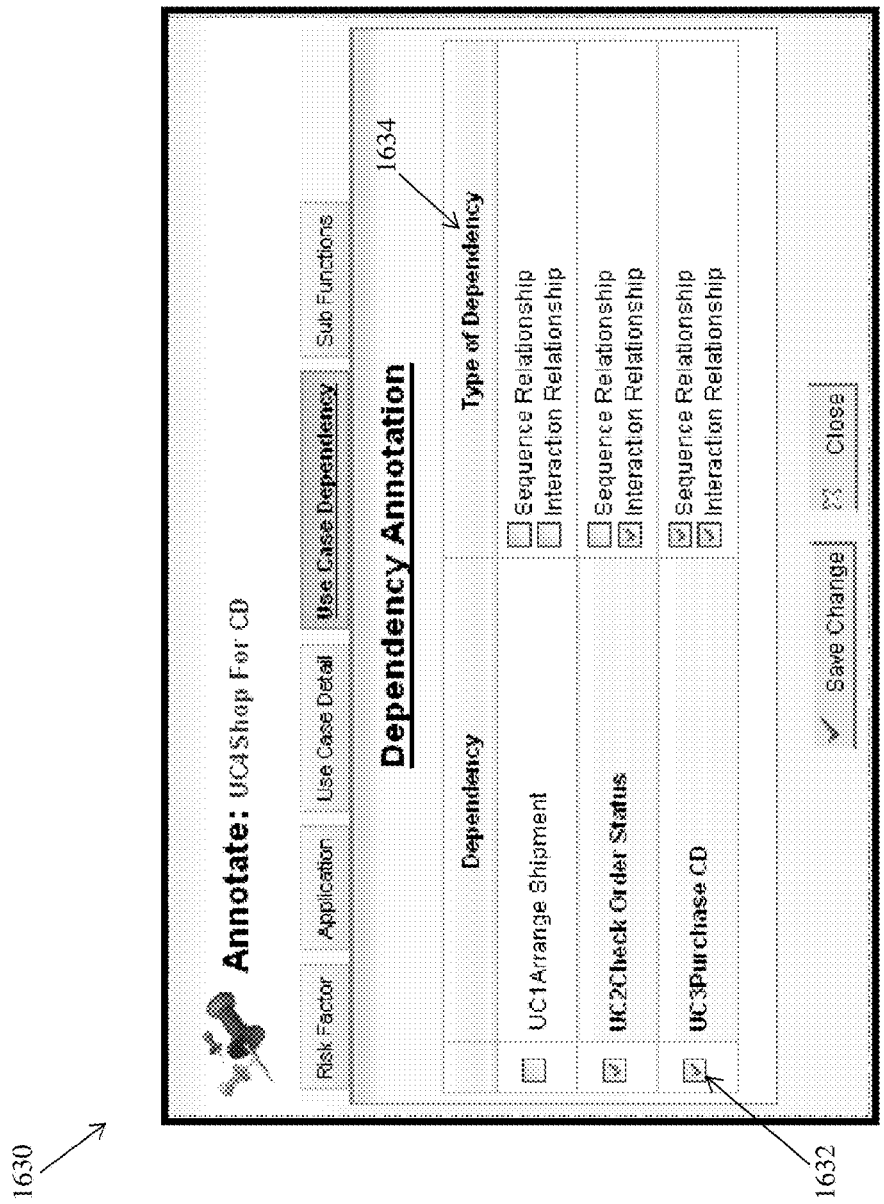

FIG. 18 shows a user interface (UI) 1630 that permits a user to annotate information regarding Sub Functions of a use case that is part of the SUT model (e.g., how the current use case interacts with other use cases). For example, a user may specify whether the particular use case, e.g., "UC4Shop For CD", has a dependency with another use case at 1632, and the type of dependency at 1634.

Figure 19:
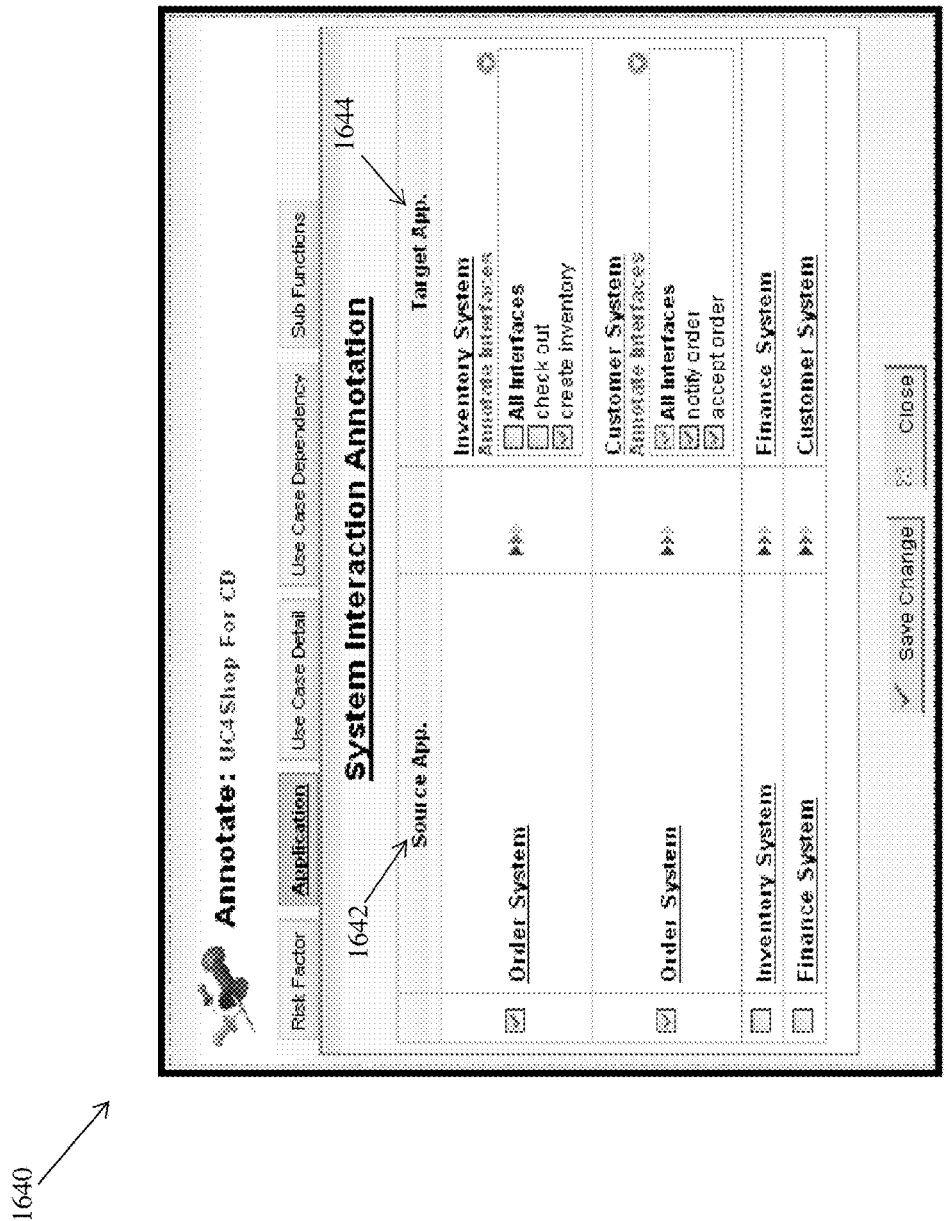

FIG. 19 shows a user interface (UI) 1640 that permits a user to annotate System Interaction information of a use case that is part of the SUT model. For example, a user may specify source applications at 1642 and target applications at 1644 (e.g., how the current use case is related to the application).

Referring to FIG. 20, sometimes it is difficult for a user to know all of the information in interfaces 1610, 1620, 1630, and 1640 due to the limited source information, (e.g., at the beginning of a project). Accordingly, in embodiments, a user interface 1650 may be provided that defines a configuration page to support test case estimation by Size and Complexity.

At step 1440, the TPOW 50 generates a structured DRM model that includes, for example, an estimated number of test cases for the testing program. In embodiments, the test cases are determined using data contained in the SUT model (including annotated information) and the logic, rules, and probability tables programmed in the TPOW 50.

In embodiments, the estimated test cases are associated with activities and triggers. As such, the test cases may be related to the macro plan since the macro plan is based on the same activities and triggers. Based on this commonality, in further embodiments, the TPOW 50 combines the estimated test plan information with the macro planning result (e.g., effort distribution and defect distribution arranged by activities and triggers) to permit a user to estimate test effort required and defects discovered in testing, as well as projecting (e.g., estimating) the resulting residual defects in production.

Figure 21:
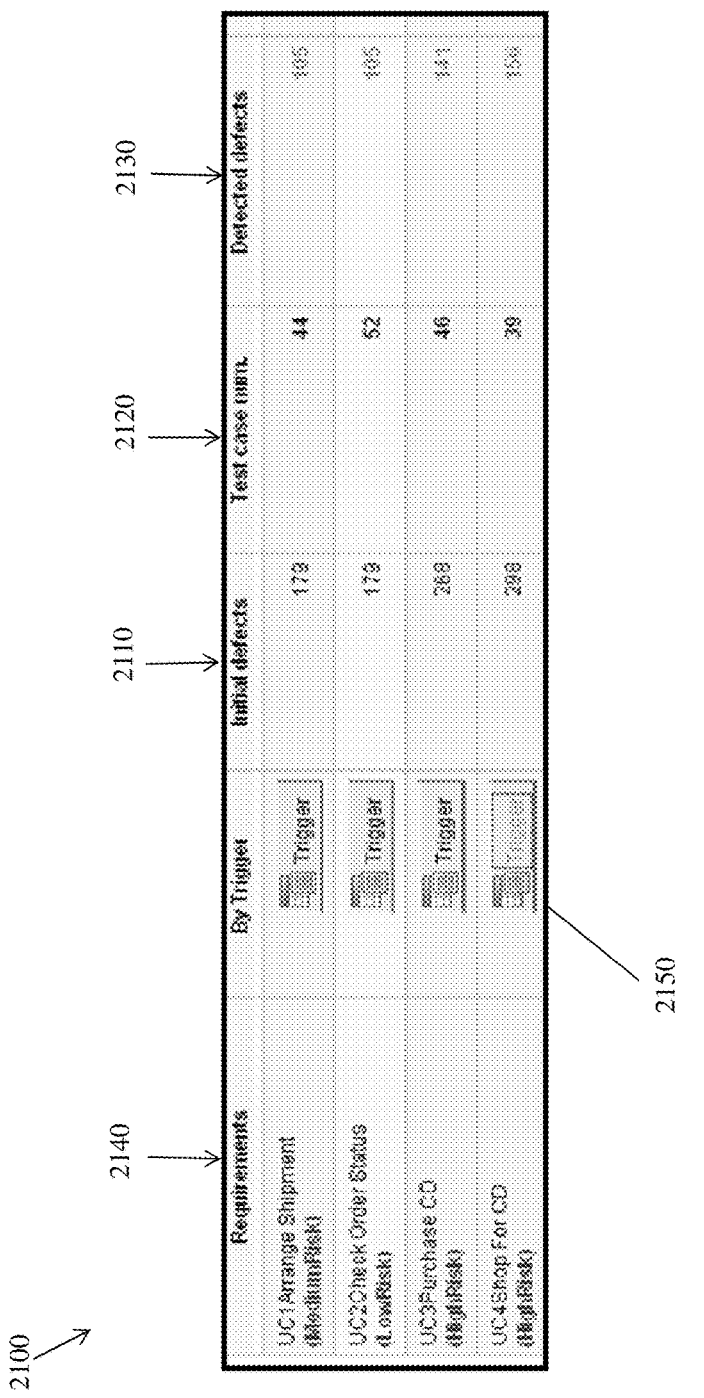

FIG. 21 depicts exemplary user interface (UI) 2100 that displays estimated numbers of test cases for particular use cases in accordance with aspects of the invention. In embodiments, the SUT model is captured (e.g., defined) in terms of use cases, and UI 2100 shows that different use case requirements may have different risk levels (e.g., High/Medium/Low). In accordance with aspects of the invention, the TPOW 50 estimates the number of initial defects (e.g., column 2110), test case number (e.g., column 2120), and detected defects (e.g., column 2130) for each use case (e.g., column 2140).

Moreover, in embodiments, the estimated number of test cases and defects may be further broken down by trigger, which gives more executable realistic guidance for designing test cases that optimally cover the key system areas in terms of risk. For example, by selecting the "Trigger" button 2150 associated with any particular use case in UI 2100, the user is presented with another user interface 2200, shown in FIG. 22, that provides more details for that particular use case.

Figure 22:
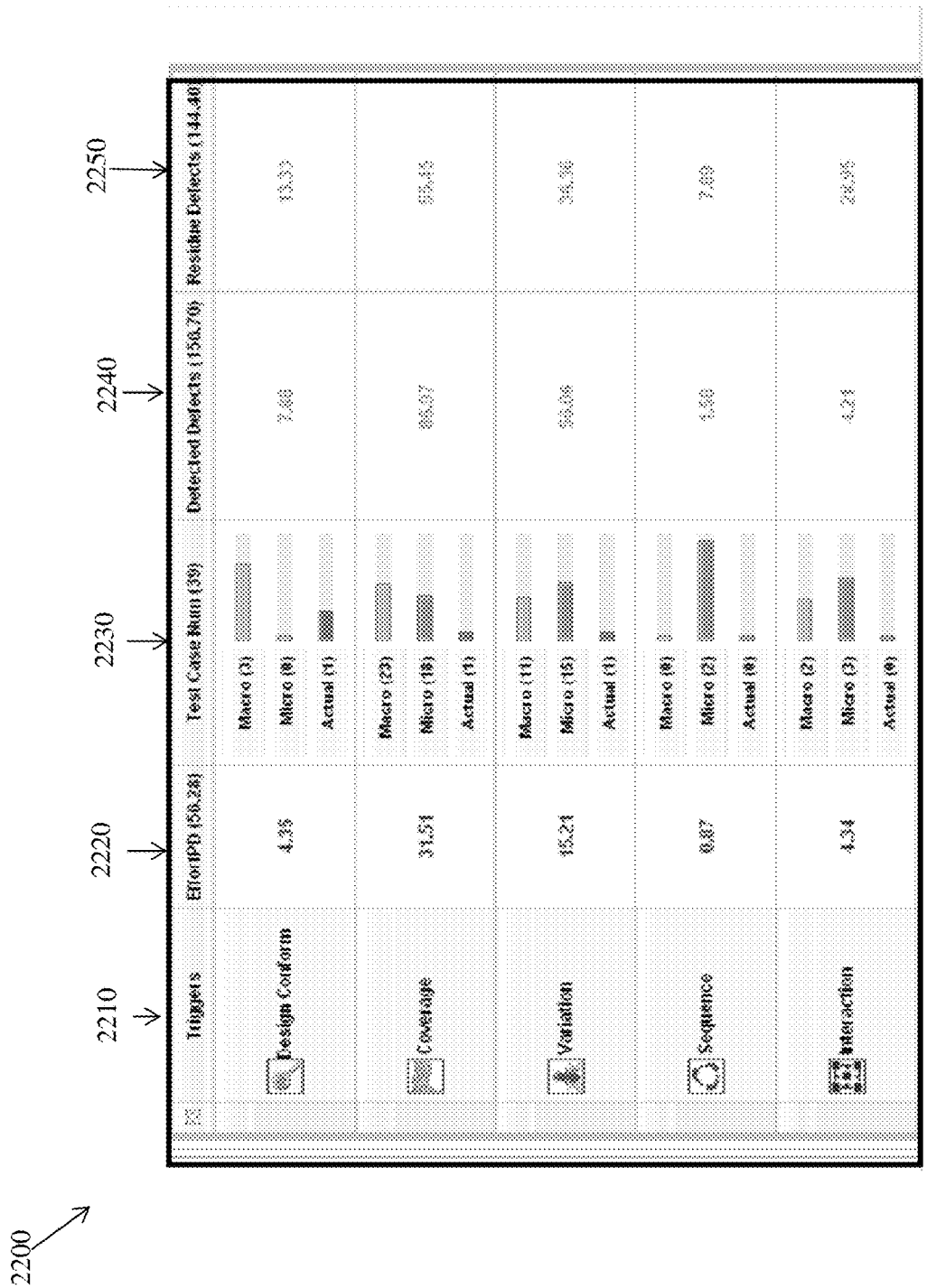

As depicted in FIG. 22, the exemplary UI 2200 includes a column 2210 that lists the triggers associated with the user case, a column 2220 that lists the effort associated with each respective trigger, a column 2230 showing the number of test cases associated with each respective trigger, a column 2240 showing the number of detected associated with each respective trigger, and a column 2250 showing the number of residue defects associated with each respective trigger. In embodiments, the "macro" test cases listed in column 2230 refer to the high level planning/estimation at project initialization phase by comparison with an existing reference project. For example, this may represent a top-down test case number estimation based on macro planning effort distribution.

In embodiments, the "micro" test cases listed in column 2230 refer to the detailed planning/estimation result by analyzing project specific information (e.g., requirements, architecture, etc.). For example, this may represent a bottom-up micro test case number estimation through annotation.

In embodiments, the "actual" test cases listed in column 2230 refer to the actual test cases that are used in the real execution (e.g., in contrast to the planned number, either macro or micro). For example, this may represent the actual number of test cases that have been created.

Referring to both FIGS. 21 and 22, in embodiments, the Initial Defects (e.g., column 2110) is based on the Residue Defects from the previous defect removal activity for each defect removal activity. For example, the Initial Defects may be distributed to different test artifacts (e.g. requirements and/or use cases associated with an activity) based on their weight (e.g., size, complexity, and risk level). In further embodiments, the Detected Defects (e.g., columns 2130 and 2240) are calculated by multiplying defect discovery efficiency and the effort devoted to each of the test artifacts. In yet further embodiments, the Residue Defects (e.g., columns 2130 and 2250) for each test artifact are calculated by subtracting the number of Detected Defects from the number of Initial Defects.

As described herein, implementations of the invention provide a user with information for creating a micro plan for the testing project. In this manner, embodiments of the invention may be used to create a bottom-up executable test plan. Moreover, embodiments may be used to apply test coverage rules and estimation algorithms in a comprehensive model that allows the user to accurately estimate and focus the test effort by trigger types and various user-identified risk factors.

Reconciling Macro Planning and Micro Planning

Figure 23:
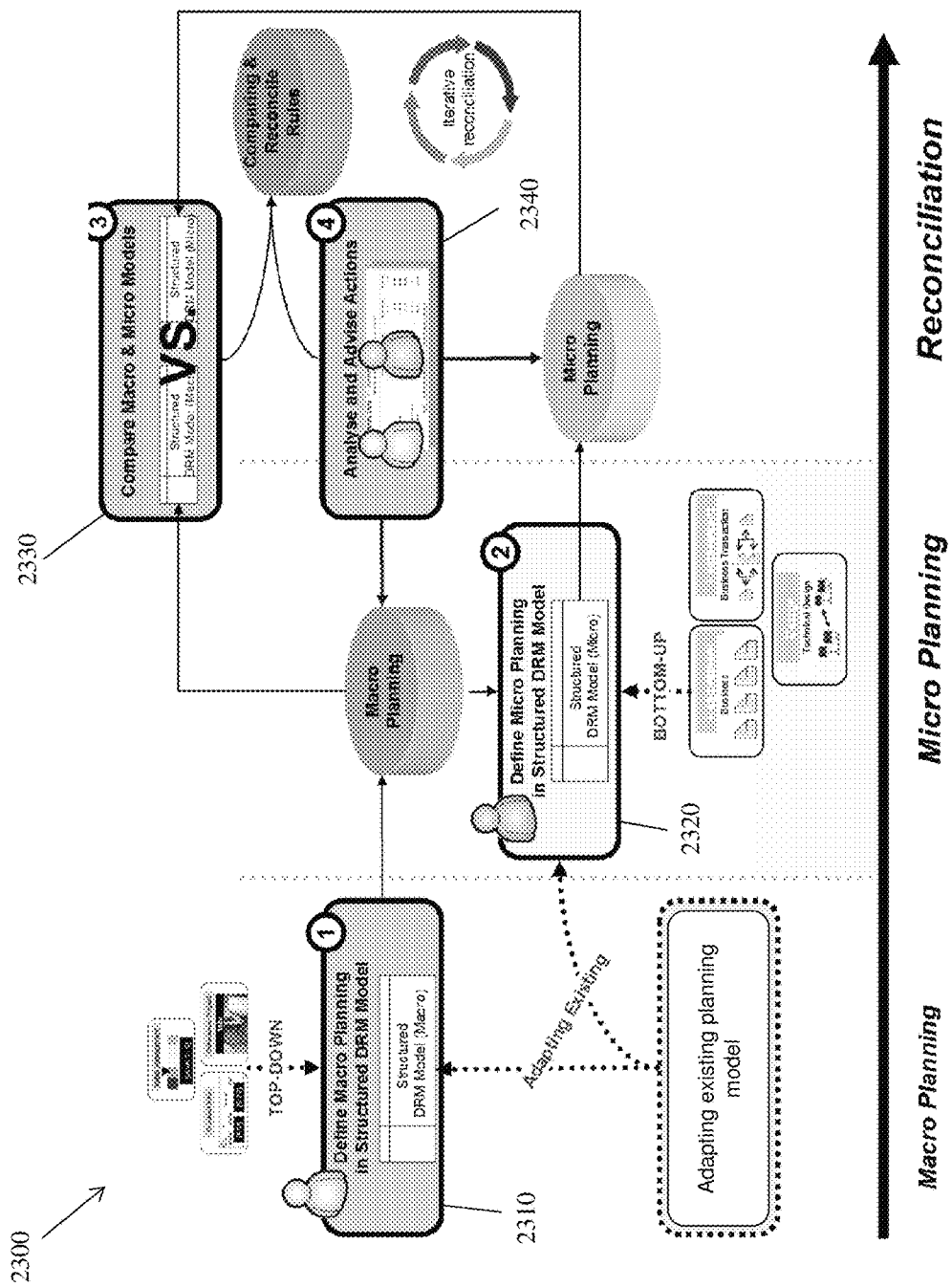
FIG. 23 illustrates a high level flow associated with reconciling in accordance with aspects of the invention.

FIG. 23 illustrates a high level flow 2300 associated with reconciling in accordance with aspects of the invention. The steps of FIG. 23 may be implemented in the environments of FIGS. 1 and/or 2. For example, the processes described in FIG. 23 may be performed using the TPOW 50, and in particular the reconciliation manager 40, as described with respect to FIG. 1.

In accordance with aspects of the invention, the TPOW 50 permits a user to define macro planning in the structured DRM model (e.g., step 2310), and also to define micro planning in the structured DRM model (e.g., step 2320). Moreover, the TPOW 50 permits a user to reconcile (e.g., compare and adjust) the macro plan and micro plan based on the relationship provided by the triggers (e.g., step 2330). As described with respect to FIGS. 6-22, triggers are used as a basis for both the macro and the micro plans. As such, the two plans can be compared to each other based on the triggers. In embodiments, the comparison identifies deviations between the macro and micro plans. In embodiment, the deviations include differences in effort, number of test cases, and estimated defects between the macro and micro plans.

In accordance with aspects of the invention, the TPOW 50 permits a user to adjust one or more details of the macro plan and/or the micro plan (e.g., step 2340), e.g., to minimize the identified deviations. Additionally or alternatively, a user may simply accept (e.g., confirm) an identified deviation, e.g., when the user is not willing to adjust an aspect of the overall test plan to accommodate for the deviation. When all of the deviations (or the deviations above a threshold) are either appropriately adjusted or confirmed, the macro plan and micro plan are considered to be reconciled. In this manner, implementations of the invention provide a planning tool that includes a closely synchronized macro plan and micro plan, which can be used to make informed decisions regarding issues including, but not limited to, staffing, scheduling, time to market, budget, etc.

The steps of FIG. 23 are further described herein with respect to FIGS. 24-27, which show exemplary graphical user interfaces of an exemplary implementation of a TPOW 50 in accordance with aspects of the invention. It is to be understood that the invention is not limited by the graphical user interfaces shown in FIGS. 24-27, and that the invention may be implemented in other manners not depicted in FIGS. 24-27.

Figure 24:
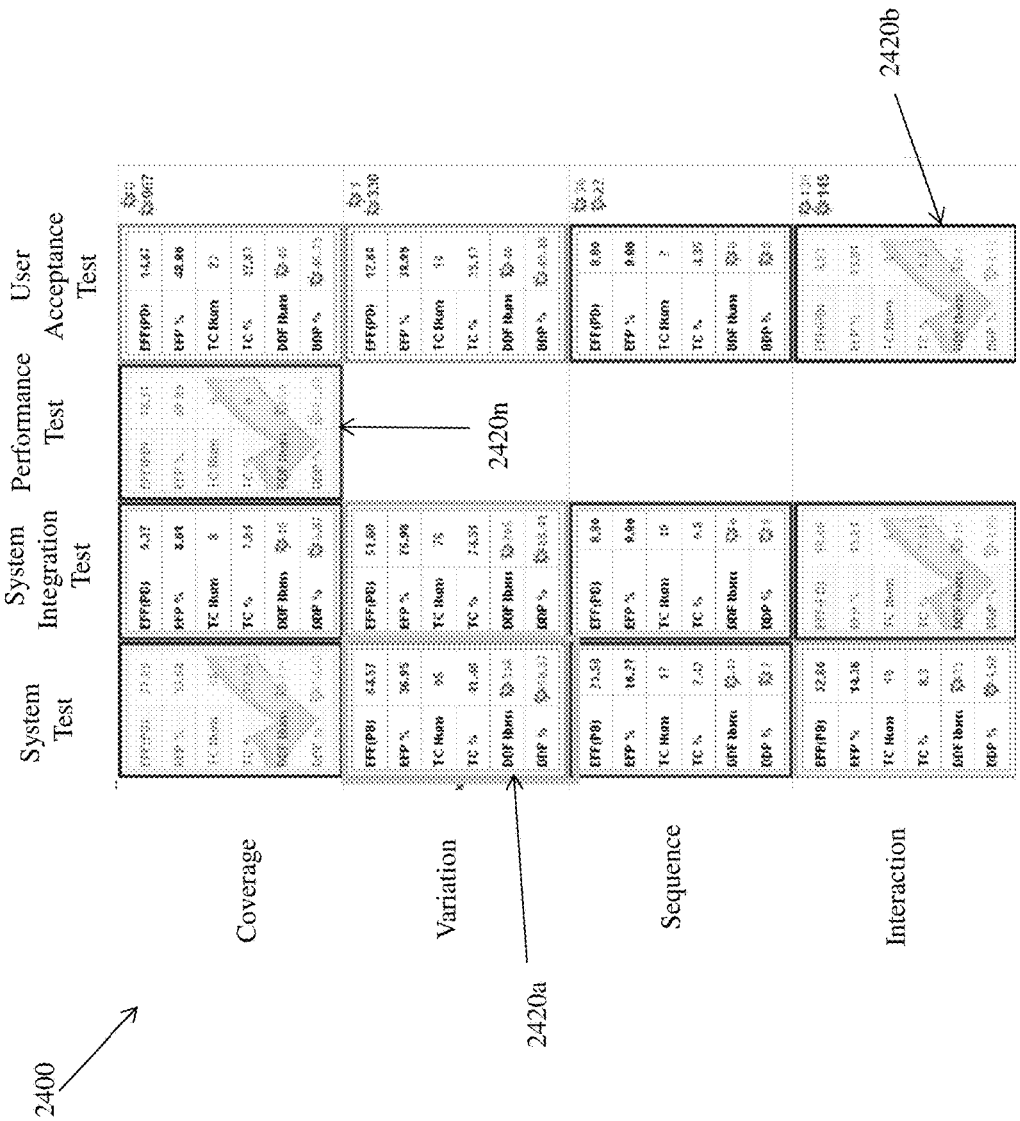
FIGS. 24-27 show exemplary user interfaces and underlying functionality in accordance with aspects of the invention.

FIG. 24 shows an exemplary user interface 2400 that provides for reconciliation of the macro planning and micro planning by presenting related details of each in a single view. In embodiments, for each intersection of activity versus trigger, the TPOW 50 compares and presents the macro and micro results side by side, and shows the deviation between the macro and micro pans by percentage and/or by actual number. For example, UI 2400 shows a matrix showing the intersection of the triggers Coverage, Variation, Sequence, and Interaction, with the activities System Test, System Integration Test, Performance Test, and User Acceptance Test. The triggers and activities are arranged in the matrix in the same manner as in the trigger matrix table 1200 described above with respect to FIG. 12.

In the matrix 2400, each cell 2420a, 2420b, ..., 2420n presents a brief comparison of the macro plan and micro plan for that particular intersection of trigger and activity. For example, cell 2420a represents a comparison of the macro and micro plans for the trigger "Variation" which is associated with the activity "System Test." In embodiments, cells that are marked with a checkmark (e.g., cell 2420b) have already been reconciled, e.g., adjusted and/or confirmed by the user. Cells that do not have a checkmark (e.g., cell 2420a) contain deviations that exceed a predefined threshold and which have not been confirmed by the user. In this manner, the matrix 2400 provides the user with a high-level presentation of the deviations between the macro and micro plans.

Figure 25:
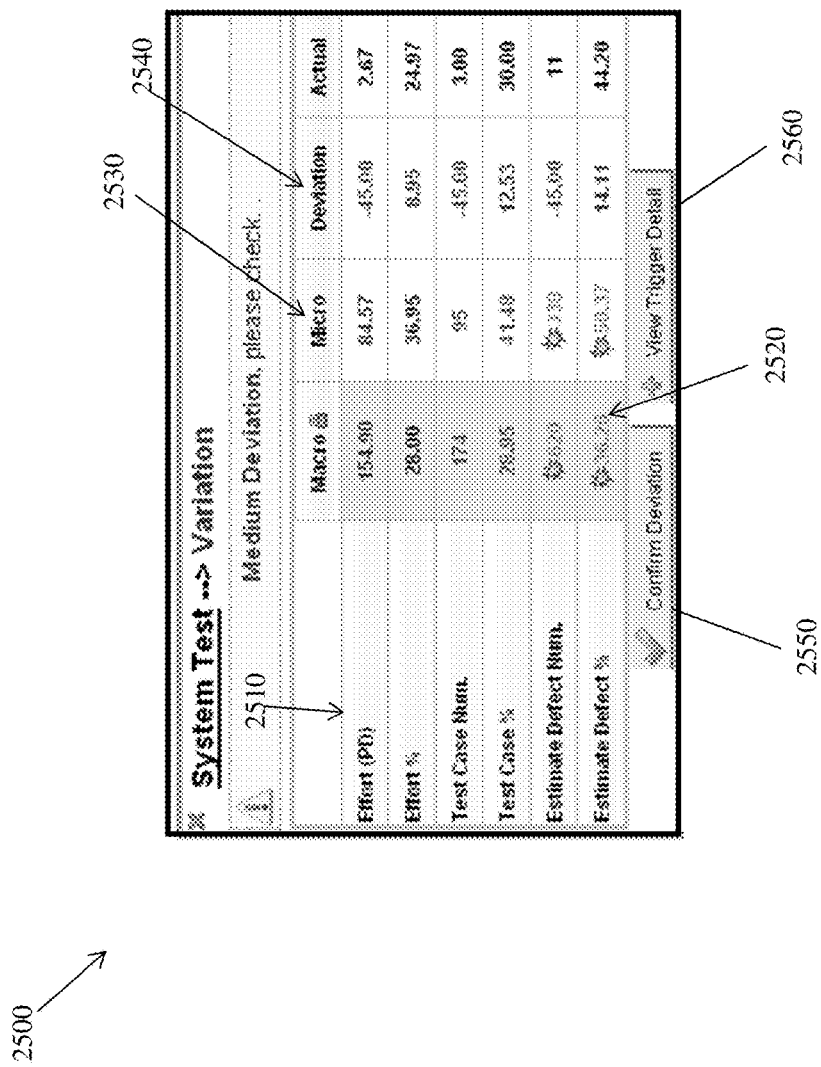

In embodiments, by selecting (e.g., clicking on) one of the cells (e.g., cell 2420a), the user is presented with a user interface 2500 that provides further detail (e.g., more granularity) regarding the deviations for that trigger/activity intersection, as depicted in FIG. 25. For example, in UI 2500 column 2510 shows estimated parameters (e.g., effort, test case number, estimated defects), column 2520 shows values for these parameters according to the macro plan, column 2530 shows values for these parameters according to the micro plan, and column 2540 shows the deviation between the macro and micro plan values. The interface may have an option for the user to confirm these deviations, e.g., button 2550, thereby indicating that the user accepts all of the deviations for the entire trigger. Alternatively, the user may view further details for these deviations by selecting another button 2560, in which case the TPOW 50 presents the user with a user interface 2600 having an even further refined view of the deviations between the macro and micro plans.

Figure 26:
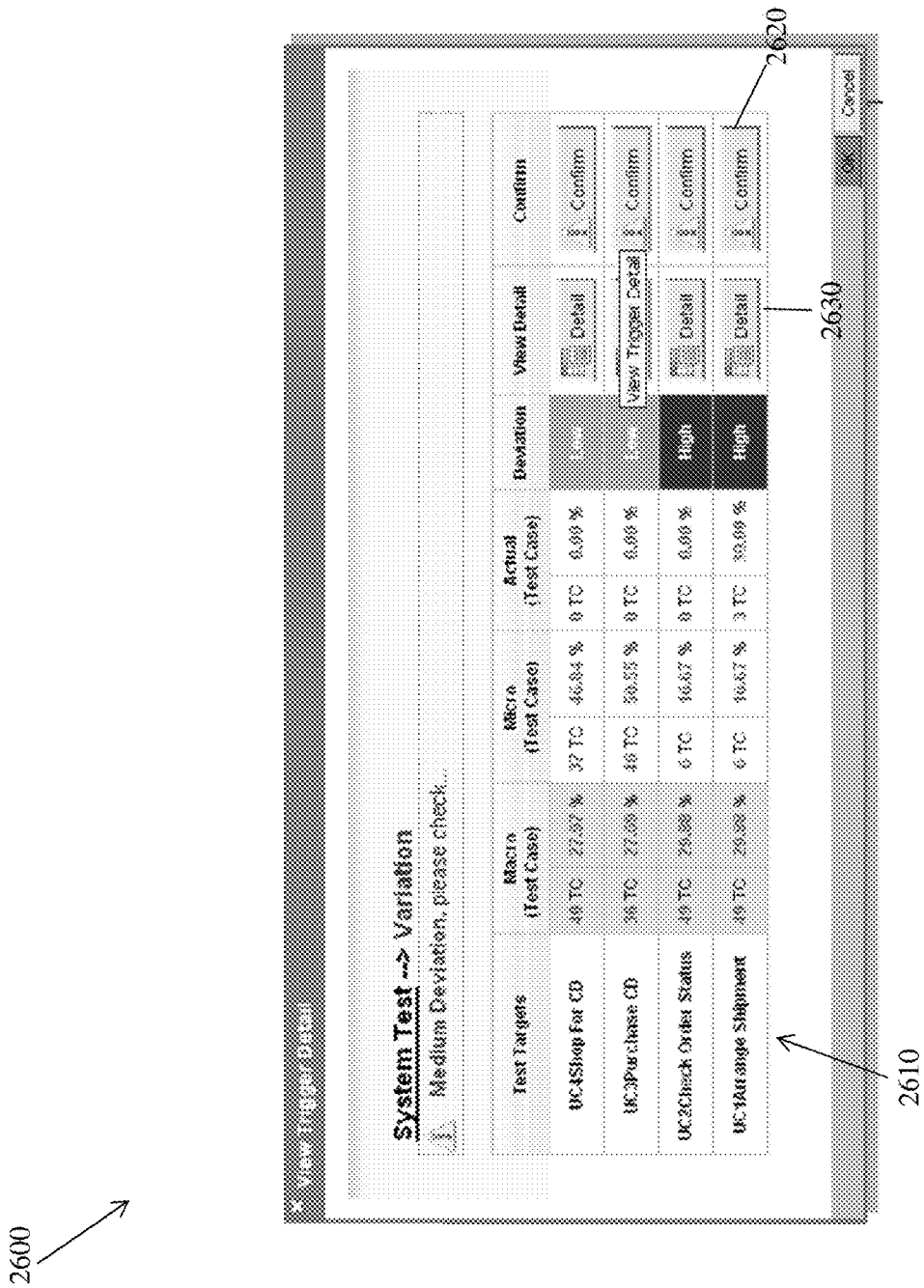
Figure 27:
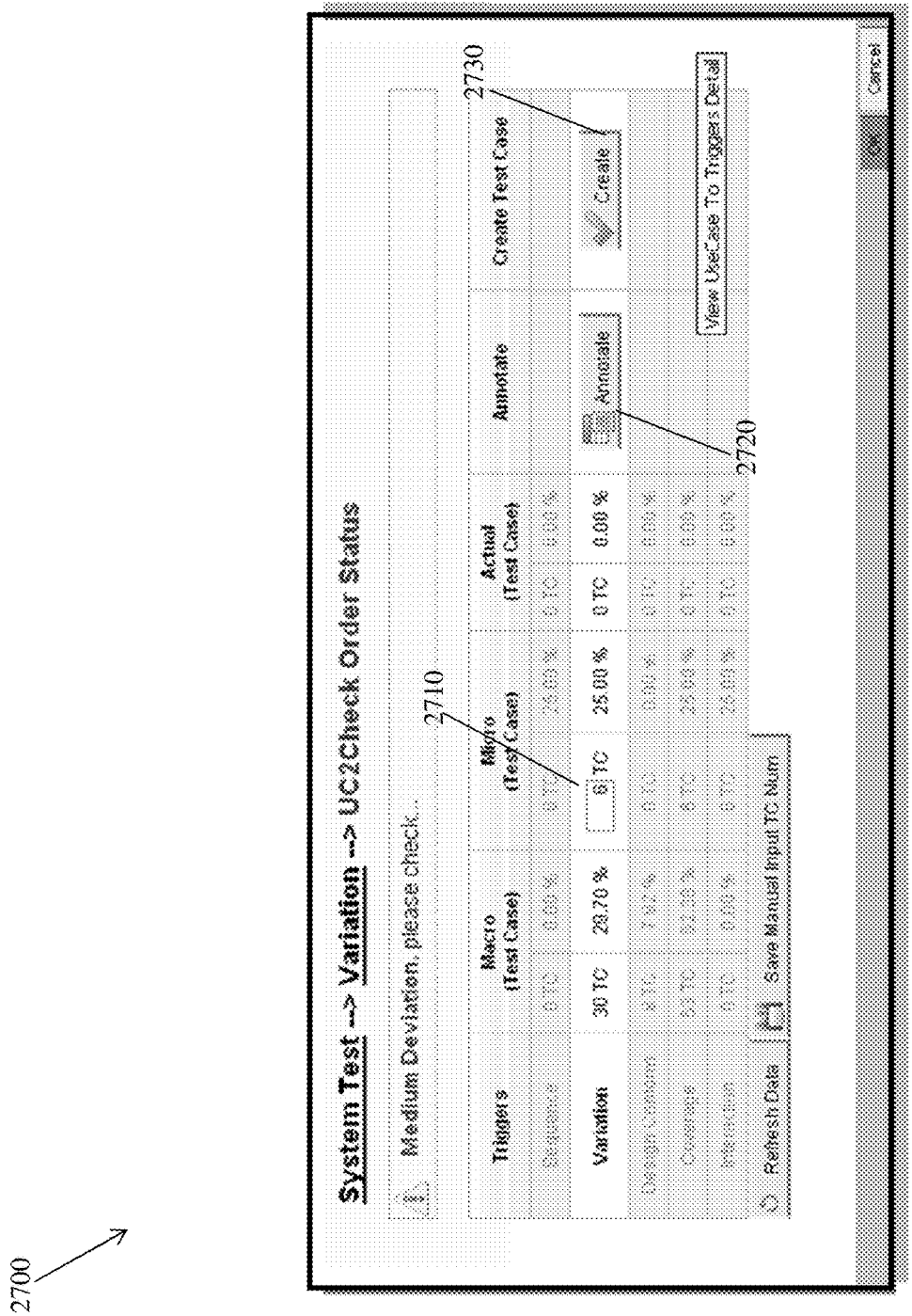

As depicted in FIG. 26, the UI 2600 shows, in column 2610, the use cases for this particular activity and trigger that have deviations above a predefined threshold. In the UI 2600, the deviations are presented in terms of number of test cases per use case for both the macro and micro plans. The UI 2600 has an option (e.g., button 2620) for the user to confirm the deviation for any particular use case, and another option (e.g., button 2630) for the user to view the details of the deviation regarding a particular use case. When the user opts to view the details of a use case (e.g., by clicking button 2630), the TPOW 50 presents the user with another user interface 2700, shown in FIG. 27.

In embodiments, the UI 2700 presents an even further level of detail regarding the deviation between the macro and micro plans, and also provides the user with the ability to adjust one or more parameters of the particular use case. For example, the UI 2700 may have one or more inputs (e.g., cells) 2710 in which the user can adjust the number of test cases in the micro plan for a particular trigger in this use case. The UI 2700 may also have an input (e.g., button) 2720 that permits the user to annotate the use case in a manner similar to that described above with respect to FIGS. 16-20. The UI 2700 may also have an input (e.g., button) 2730 that permits the user to create a new test case for a particular trigger in this use case.

In embodiments, when a user provides information to the system via any one or more of the inputs 2710, 2720, 2730, this information will then be used by the TPOW 50 in updating the macro and/or micro plans. In embodiments, the updating may include recalculating one or more aspects of the macro and/or micro plan based on the new data provided by inputs 2710, 2720, 2730. In embodiments, the recalculating may be performed as in step 630 and/or step 1440, described above. In this manner, during the reconciling, the user may adjust one or more aspects of the macro and/or micro plan and see the effect of the adjustment ripple through both plans.

Accordingly, in step 2340, the TPOW 50 may provide a set of actions to fix a deviation between the macro and micro plans. The set of actions may include, for example, confirming the deviation (e.g., the deviation range is acceptable to user, described above with respect to elements 2550 and 2620). The set of actions may include, for example, further annotating the use case (e.g., re-analyze the system under test model, described above with respect to element 2720). The set of actions may include, for example, manual input (e.g., manually changing a test case number in the micro plan, described above with respect to element 2710). The set of actions may include, for example, creating test one or more test cases (e.g., create more designed test cases, described above with respect to element 2730). In embodiments, the TPOW 50 is programmed to, based on the comparison of the macro and micro plans, extrapolate a set of potential actions that may help the user to reconcile the deviation between the macro and micro plans. In embodiments, after step 2340 the process returns to step 2330 until the all deviations are fixed and/or accepted. At this point, the user has a reconciled macro plan and micro plan that can be leveraged to guide the test execution. In this manner, implementations of the invention provide a system and method for reconciling macro (top-down) and micro (bottom-up) test plans based on the structured DRM model. In embodiments, the reconciliation process includes: discovering and highlighting deviations between the plans; providing deviation information to a user; analyzing and further breaking down the deviations to finer levels of granularity; provide executable actions for handling the deviations; confirming the deviations.

Figure 28:
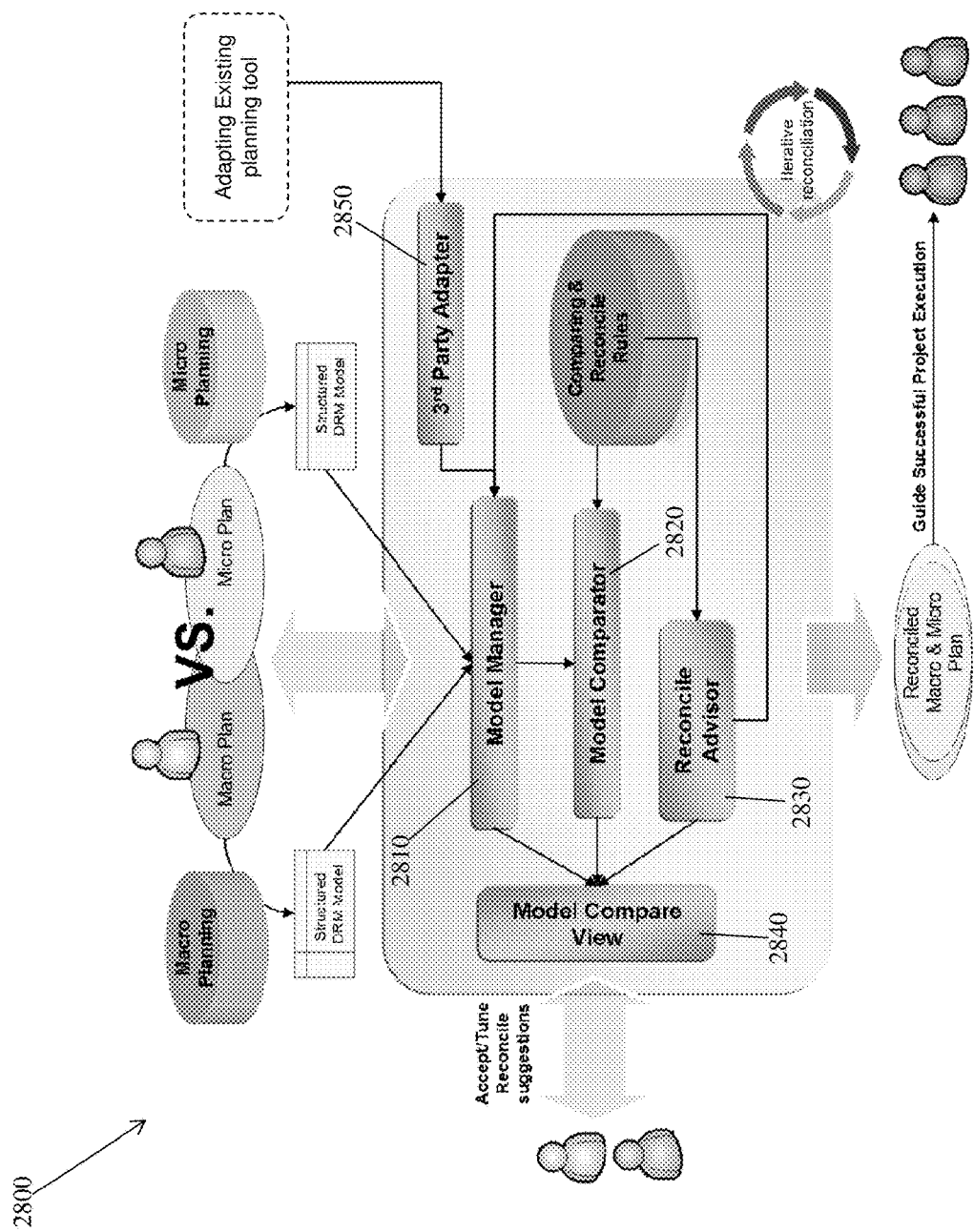
FIG. 28 illustrates a high level flow associated with a reconciliation manager in accordance with aspects of the invention.

FIG. 28 illustrates a high level flow 2800 that represents the operation of the reconciliation manager in accordance with aspects of the invention. The aspects of FIG. 28 may be implemented in the environments of FIGS. 1 and/or 2. For example, the aspects described in FIG. 28 may be included in TPOW 50, and in particular the reconciliation manager 40, as described with respect to FIG. 1.

In accordance with aspects of the invention, the TPOW 50 utilizes a model manager 2810, model comparator 2820, reconcile advisor 2830, model compare view module 2840, and third party adapter module 2850, all of which may be programmed into, or separate from, the reconciliation manager 40. In embodiments, the model manager 2810 is used to access and manage the structured DRM model in the repository. This provides other components with the ability to access or change model data. In embodiments, the model comparator 2820 pulls together macro and micro DRM model information from the model manager 2810. The model comparator 2820 may also produce a comparison of the macro and micro plans based on the rules created, which comparison may be used to highlight the deviation level, e.g., High, Medium, or Low in terms of Testing Effort and Defect Number.

In embodiments, the reconcile advisor 2830 extrapolates a set of potential actions that will help to reconcile the differences between the macro and micro plans. In embodiments, the model compare view module 2840 presents one or more user interfaces for the user to access and make decisions with respect to suggested reconciliation actions. In embodiments, the third party adapter module 2850 adapts information from third party tools (e.g.: RQM, HP Quality Center) into the defined structured test planning model in order to perform reconciliation.

Figure 29:
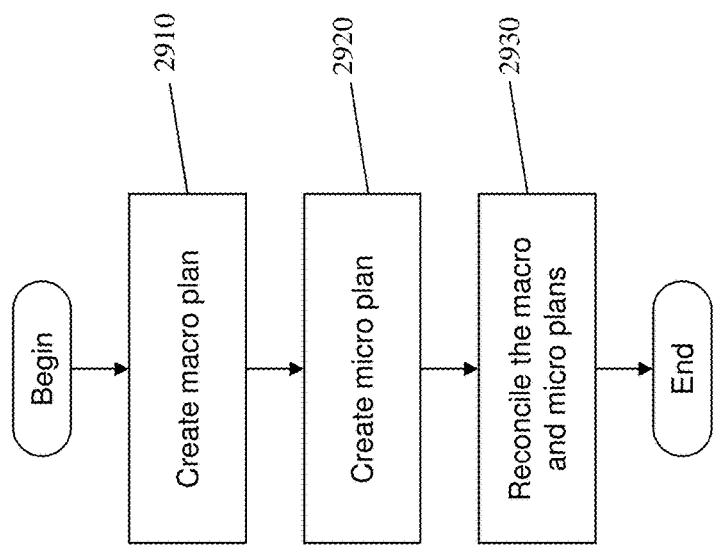
FIG. 29 shows an exemplary flow diagram in accordance with aspects of the invention.

FIG. 29 depicts an exemplary flow 2900 for a process in accordance with aspects of the present invention. At step 2910, a macro plan is created using the TPOW 50. This may be performed as described above with respect to FIGS. 6-13, and may include estimates of effort and defects per trigger and activity. At step 2920, a micro plan is created using the TPOW 50. This may be performed as described above with respect to FIGS. 14-22, and may include number of test cases to be performed per trigger and activity. At step 2930, the macro and micro plans are reconciled the TPOW 50. This may be performed as described above with respect to FIGS. 23-28.

As described herein, implementations of the invention provide the real time insight necessary to find and fix defects earlier by using both a top down (e.g., macro) and bottom up (e.g., micro) planning approach. In embodiments, top down (e.g., macro) planning is used to provide planning early in the life cycle when very little project information exists (but plans must nevertheless be put into place for the project to succeed). Also in embodiments, bottom up (e.g., micro) planning is used to make projections about defect rates, cost, schedule, etc., be more accurate later in the life cycle when more project information becomes available. In accordance with aspects of the invention, the top down (e.g., macro) and bottom up (e.g., micro) models are provided together, reconciled, and capable of continuous refinement in real time (e.g., as real data replaces predictive data during the project life cycle).

In accordance with some aspects of the invention, the trigger/activity information about how defects are uncovered (e.g., discovered, found, etc.) is a basis for the predictive model. In embodiments, by using the trigger/activity aspects of the DRM, defects are characterized qualitatively with respect to how they were found and in a way that enables accurate future projections. Implementations of the invention, predict not only the number of defects that will be found, but also what kind of defects they will be, including defects other than code defects.

In embodiments, there is a process for identifying and managing testing dependencies based on triggers. The use of triggers allows implementations to classify dependencies in a way that allows the allocation of resources to be optimized.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims, if applicable, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principals of the invention and the practical application, and to enable others of ordinary skill in the art to understand the invention for various embodiments with various modifications as are suited to the particular use contemplated. Accordingly, while the invention has been described in terms of embodiments, those of skill in the art will recognize that the invention can be practiced with modifications and in the spirit and scope of the appended claims.

What is claimed is:

1. A method implemented in a computer infrastructure having computer executable code tangibly embodied on a computer readable storage medium having programming instructions operable to:
   create a macro plan using the computer infrastructure for a test project for design of a software product that includes estimating an effort distribution and a defect distribution of defects in the software product, and generating a cost overview of the test project based on the effort distribution and the defect distribution, wherein the estimating of the defect distribution is performed by a computing system that is included in the computer infrastructure and that leverages an input of test effort distribution and test efficiency to generate an estimate of a testing result which includes defect history and production defect numbers classified by type;
   create a micro plan using the computer infrastructure for the test project, wherein the micro plan and the macro plan are based on at least one common parameter; and
   reconcile the macro plan and the micro plan using the computer infrastructure by identifying deviations between the macro plan and the micro plan based on the at least one common parameter to identify and resolve defects in the software product based on the reconciling of the macro plan and micro plan,
   wherein the reconciling of the macro plan and the micro plan includes comparing the macro plan and the micro plan side-by-side to show the deviations which include effort, number of test cases and estimated defects between the macro plan and the micro plan based upon a matrix showing intersections of orthogonal defect classification (ODC) triggers and activities, and
   wherein comparing the macro plan and the micro plan side-by-side is performed by a model comparator in the computer infrastructure based on predetermined rules to highlight a deviation level between the macro plan and the micro plan in terms of testing effort and defect number.

2. The method of claim 1, wherein the creating the macro plan further includes permitting a user to specify a constraint; and the effort distribution and the defect distribution are estimated based on the constraint.

3. The method of claim 2, wherein the constraint comprises one of total effort and maximum field defects.

4. The method of claim 1, wherein the programming instructions are further operable to:
   permit a user to adjust one of the effort distribution and the defect distribution; and
   re-estimate the effort distribution and the defect distribution based on the adjusting.

5. The method of claim 1, wherein the creating the micro plan includes:
   creating a system under test (SUT) model based on test requirements;
   receiving annotations of the SUT model from a user; and
   estimating a test case distribution for the SUT model.

6. The method of claim 5, wherein the test case distribution is based on a same set of triggers and activities as the macro plan.

7. The method of claim 6, wherein the annotations are related to aspects of use cases of the SUT model.

8. The method of claim 7, wherein the reconciling includes comparing at least one of effort, number of test cases, and estimated defects between the macro plan and the micro plan.

9. The method of claim 8, wherein the at least one of effort, number of test cases, and estimated defects are defined in terms of activities and triggers.

10. The method of claim 1, wherein the reconciling includes:
    presenting the deviations between the macro plan and the micro plan to a user; and
    for at least one of the deviations, receiving from the user one of a confirmation of or an adjustment of at least one of the deviations, wherein the adjustment comprises at least one of:
      manually changing a number of test cases in the micro plan,
      annotating a use case of the micro plan, and
      creating a new test case in the micro plan.

11. The method of claim 1, wherein a service provider at least one of creates, maintains, deploys and supports the computing infrastructure.

12. The method of claim 1, wherein the computing infrastructure is provided by a service provider under a subscription and/or fee agreement and/or based on advertising content to one or more third parties.

13. The method of claim 1, wherein the ODC triggers include at least one of coverage, variation, sequence and interaction and the ODC activities include at least one of system test, system integration test, performance test and user acceptance test.

14. The method of claim 13, further comprising considering the macro plan and the micro plan reconciled when all deviations are appropriately adjusted or confirmed.

15. The method of claim 14, further comprising marking cells of the macro plan and the micro plan when the macro plan and the micro plan have been appropriately adjusted or confirmed.

16. The method of claim 15, wherein:
    creating the macro plan further includes permitting a user to specify a constraint;
    estimating the effort distribution and the defect distribution is based on the constraint;
    creating the micro plan includes:
      creating a system under test (SUT) model based on test requirements;
      receiving annotations of the SUT model from a user; and
      estimating a test case distribution for the SUT model; and
    the reconciling includes:
      presenting the deviations between the macro plan and the micro plan to a user; and
      for at least one of the deviations, receiving from the user one of a confirmation of or an adjustment of at least one of the deviations, wherein the adjustment comprises at least one of:
        manually changing a number of test cases in the micro plan,
        annotating a use case of the micro plan, and
        creating a new test case in the micro plan.

17. The method of claim 1, wherein the reconciling includes comparing at least one of effort, number of test cases, and estimated defects between the macro plan and the micro plan.

18. The method of claim 17, wherein the at least one of effort, number of test cases, and estimated defects are defined in terms of activities and triggers.

19. The method of claim 1, wherein the computing system includes at least one of an opportunity benefit analysis module, a predictive model at multiple levels, risk-based test planning, and a test process optimization engine.

20. The method of claim 19, further comprising providing an optimized test effort distribution with a base return on investment using the optimized test optimization engine.

* * * * *